United States Patent [19]

Fukuda et al.

[11] Patent Number: 5,991,752
[45] Date of Patent: Nov. 23, 1999

[54] METHOD AND APPARATUS FOR DERIVING ASSOCIATION RULES FROM DATA AND FOR SEGMENTING RECTILINEAR REGIONS

[75] Inventors: Takeshi Fukuda, Yokohama; Kunikazu Yoda; Takeshi Tokuyama, both of Machida; Shinichi Morishita, Yokohama, all of Japan

[73] Assignee: International Business Machines Corporation, Armonk, N.Y.

[21] Appl. No.: 09/025,536

[22] Filed: Feb. 18, 1998

[30] Foreign Application Priority Data

Feb. 19, 1997 [JP] Japan .................................... 9-034605

[51] Int. Cl.$^6$ .................................................. G06F 17/30
[52] U.S. Cl. ........................................ 707/1; 707/3; 707/6
[58] Field of Search ................................ 707/1, 2, 6, 3, 707/101, 102, 200

[56] References Cited

U.S. PATENT DOCUMENTS 5,724,573  3/1998  Agrawal et al. ............................ 707/6
5,812,997  9/1998  Morimoto et al. ......................... 707/2
5,870,748  2/1999  Morimoto et al. ....................... 707/101

*Primary Examiner*—Paul V. Kulik
*Attorney, Agent, or Firm*—Khanh Q. Tran

[57] ABSTRACT

The present application discloses a method and apparatus for extracting association rules from data having two or more numeric attributes and a true-false attribute, and for presenting the rules in an easily understandable form. The method comprises the steps of: (i) storing numbers $u(i,j)$ and $v(i,j)$ of data in each pixel whose true-false attribute is true, so as to correspond to each pixel in a plane; (ii) inputting a condition θ; (iii) segmenting from the plane a rectilinear region S of the pixels to maximize the equation $$\sum_{(i,j)\in S} g(i,j) = \sum_{(i,j)\in S} (v(i,j) - \theta u(i,j)); \text{ and}$$

;and (iv) outputting data included in the segmented rectilinear region S. The invention also allows regions to be derived which satisfy a desired support maximization rule, confidence maximization rule, optimized entropy rule, and optimized interclass variance rule.

20 Claims, 16 Drawing Sheets

```
for k=0 to N_y -1 do
    for s=0 to N_y -1-k do
        t=s+k
        CALCULATE f_m^W (s, t) USING EQUATION 30
    end
end
```

```
for t:=0 to N_y -1 do
    β^W =0
    β^U =0
    for s:=0 to t do
        if f_{m-1}^W (s, t) > f_{m-1}^W (β^W, t) then β^W =s
        if f_{m-1}^U (s, t) > f_{m-1}^U (β^U, t) then β^U =s
        β_{m-1}^W (s, t) = β^W
        β_{m-1}^U (s, t) = β^U
    end
end
```

```
for s=0 to Ny-1 do
    for t=s to Ny-1 do
        CALCULATE f_m^U (s, t) USING EQUATION 33
    end
end
```

```
for s:= Ny-1 to 0 do
    τ^W = Ny-1
    τ^D = Ny-1
    for t: = Ny-1 to s do
        if f_{m-1}^W(s, t) > f_{m-1}^W(s, τ^W) then τ^W = t
        if f_{m-1}^D(s, t) > f_{m-1}^D(s, τ^D) then τ^D = t
        τ_{m-1}^W (s, t) = τ^W
        τ_{m-1}^D (s, t) = τ^D
    end
end
```

```
for t=N_y-1 to 0 do
    for s=t to 0 do
        CALCULATE f_m^D (s, t) USING EQUATION 36
    end
end
```

```
                for k= Ny -1 to 0 do
                    for t = Ny -1 to k do
FIG. 17                     s = t -k
                            CALCULATE f_m^N (s, t) USING EQUATION 37
                    end
                end
```

| 31,30 | 29, ... , 0 |
|---|---|
| CHANGE TENDENCY Y | SECTION [u, v] |

METHOD AND APPARATUS FOR DERIVING ASSOCIATION RULES FROM DATA AND FOR SEGMENTING RECTILINEAR REGIONS

FIELD OF THE INVENTION

The present invention relates generally to analysis of data correlation in a database (referred to as data mining), and more particularly to a method and apparatus for finding a correlation between data items having two terms of numeric attributes and one term of true-false attribute (a true-false condition or 0-1 attribute).

BACKGROUND OF THE INVENTION

Consider the following problem about customers of a bank: what their floating deposit balances and their age must be so that the number of people having a time deposit balance of two million yen or more is 20% or more of the total number? The floating deposit balance and age are integers which are continuous numeric values, while the time deposit balance of two million yen or more is a classification of not less than two million yen or less than two million yen. The time deposit balance therefore has a true-false attribute. Similarly, a true-false attribute may represent, for instance, a question such as "Does the customer have a credit card?" or "is the customer male?" If such a query can be solved, the bank can easily find out, for instance, who it should send a new product advertisement to in order to efficiently conduct its business.

Conventionally, studies on the fast extraction of a rule (association rule) to represent a correlation between true-false attributes have been made in the field of data mining. These methods are described, for instance, in "Mining Association Rules Between Sets of Items In Large Databases," R. Agrawal et at., Proc. of the ACM SIGMOD Conference on Management of data, May 1993, and in "Fast Algorithms For Mining Association Rules," R. Agrawal et al., Proc. of the 20th VLDB Conference, 1994.

Furthermore, the following conventional techniques for determining rules between two-term numeric data are also known in the art.

1. Techniques of searching for a straight line in a plane that optimally approximates a set of points to find a strong linear correlation: These include, for example, least squares methods, recurrent center methods, etc. A drawback of these methods is that only a linear correlation can be found. Also, their accuracy is low if each data is predicated using the linear correlation and the absolute value of the correlation coefficient is 0.5 or less. Their usefulness is therefore limited.

2. Techniques for finding squares, rectangles, or circles or ellipses containing much data for the area thereof on a two-dimensional plane to find a weak global correlation: An example of these techniques is one using a calculation geometry algorithm, which generally has a long calculation time. For instance, a time more than $O(M^3)$ may be required for circles. $O(M^3)$ means that a calculation time of order $M^3$ is required, where M represents the number of data. Further, a correlation region to be taken out is limited to only those having a fixed shape. However, there are not many cases in which a proper coverage is provided by a fixed shape.

3. Techniques for dividing a plane into a square mesh, and extracting pixels containing much data: The extracted pixels are often not connected, but exist apart from each other. It is therefore difficult to detect them as rules.

The above approaches also have a drawback of being difficult to distinguish meaningful rules from those that are meaningless. Generally, whether a correlation is practically meaningful often must be determined by a person. In the first two groups, meaningful correlations are easy to overlook since only special correlations can be taken out. In the third group, a person cannot find any rule by looking at the output.

Other methods include one for dividing a plane into a square mesh, and segmenting a region containing much data, which is in connection with pixels and x-monotone. (See, for example, "Data Mining Using Two-dimensional Optimized Association Rules: Scheme, Algorithms, and Visualization," Takeshi Fukuda et al., Proc. of the ACM SIGMOD Conference on Management of Data, pages 13–23, June 1996). The x-monotone means that it is convex in the column direction, but not in the row direction. Although this method can take out a correlation having a certain meaning at high speed, it often segments a complicated region which dramatically varies in the vertical direction, and thus it is difficult for a person to grasp by looking which portion has a strong correlation. Further, there is a disadvantage that the shape of a segmented region largely depends on how square meshes are given (i.e., how data is distributed to each pixel), because the region is x-monotone.

SUMMARY OF THE INVENTION

It is an object of the present invention to provide a technique for finding association rules from data having two or more terms of numeric attributes and a true-false attribute.

It is another object of the present invention to present the association rules in a form which is easy to understand. It is also an object of the invention to extract as many association rules as possible to widen a user's choice, thus obtaining more important association rules.

It is yet another object of the invention to obtain ranges (regions) which satisfy: (1) a support maximization rule in which the proportion of data whose true-false attribute is true is equal to or larger than a predetermined value, and the number of included data points is maximum; (2) a confidence maximization rule in which the proportion of data whose true-false attribute is true becomes maximum when the minimum number of included data is known; (3) an optimized entropy rule in which, when division between the inside and outside of a region to be taken out is considered, the increase of information from before to after the division is maximized; and (4) an optimized interclass variance rule in which, when the division between the inside and outside of a region is considered, the square sum of the deviations from the average of the standardized proportions of true and false of the inside and outside is maximized.

It is also an object of the present invention to provide a method for determining association rules from the data at high speed.

Generally, a subject to be analyzed has many numeric attributes. By selecting two numeric attributes from them, and performing the following steps for the two numerical attributes and a true-false attribute, the above objects are attained.

(1) A plane is constructed by two numeric attributes. This plane is divided into pixels, and the number of data in each pixel and the number of data in each pixel, whose true-false attribute is true, are counted. Such plane may be grasped as a plane image having a plurality of pixels, in which the number of data corresponds to gradation, and the number of data whose true-false attribute is true corresponds to chroma.

(2) According to a predetermined condition θ, a rectilinear region, which is a region convex to the two axes of the plane, is segmented to find an association rule between data.

(3) If the segmented rectilinear region satisfies the condition such as the above-mentioned support maximization rule, the rectilinear region is presented to the user. Further, the necessary attributes of the data contained in the rectilinear region are extracted from a database as needed.

Furthermore, the segmented rectilinear region may be directly presented to the user, or if a plurality of rectilinear regions are segmented, they may be visualized as motion pictures to help find a desired association rule.

Also, it is possible that, after once segmenting a rectilinear region, the chroma is averaged for the segmented rectilinear region to find other association rules, and the segmentation step is again executed.

In the first case, an axis of floating deposit balance and an axis of age are provided, and their plane is divided into an appropriate mesh. Then, for a pixel which is each element of the mesh, the number of corresponding customers and the number of customers having a time deposit balance not less than two million yen are counted. And, for instance, by segmenting a region which is a rectilinear region in which 20% of the total customers is included and the proportion of customers having a time deposit balance not less than two million yen is maximum, the confidence maximization rule can be obtained.

Further, for instance, by segmenting a rectilinear region in which the proportion of customers having a time deposit balance not less than two million yen is 10% and the maximum number of customers is included, the support maximization rule can be obtained.

To summarize the above described matter, in a database having data including at least two kinds of numeric attributes and at least one kind of true-false attribute, first, correspondingly to each pixel (i-th row, j-th column) of a plane having two axes corresponding to the two kinds of numeric attributes and divided into N×M pixels, the number $u(i, j)$ of data belonging to a pixel (i-th row, j-th column) and the number $v(i, j)$ of data in the pixel, whose true-false attribute is true, are stored (plane forming step). Then, a predetermined condition $\theta$ is input. And, a rectilinear region S of pixels maximizing $$\sum_{(i,j) \in S} g(i, j) = \sum_{(i,j) \in S} (v(i, j) - \theta u(i, j)) \qquad (1)$$

is segmented (region segmentation step). The segmentation of a region of a rectilinear shape in this way allows a person to grasp an association rule more easily. Further, the dependency from the above plane forming step can be reduced. Finally, the data included in the segmented rectilinear region S is output. Thus, data matching the rule can be obtained.

Further, it is also possible that a second condition $\theta_2$ different from the input condition $\theta$ is input, a second rectilinear region $S_2$ of pixels maximizing $$\sum_{(i,j) \in S_2} g(i, j) = \sum_{(i,j) \in S_2} (v(i, j) - \theta_2 u(i, j)) \qquad (2)$$

is segmented, and with $$\theta 3 = \frac{V(S_2) - V(S)}{U(S_2) - U(S)} \qquad (3)$$

(it is assumed that $V(S_2)$ is the number of data included in the rectilinear region $S_2$, whose true-false attribute is true, $V(S)$ is the number of data included in the rectilinear region S, whose true-false attribute is true, $U(S_2)$ is the number of data included in the rectilinear region $S_2$, and $U(S)$ is the number of data included in the rectilinear region S) as a third condition, a third region $S_3$ maximizing $$\sum_{(i,j) \in S_3} g(i, j) = \sum_{(i,j) \in S_3} (v(i, j) - \theta_3 u(i, j)) \qquad (4)$$

is segmented from the plane. Such process is useful if a desired target rule cannot be derived with the first condition $\theta$. Generally, to determine the above-mentioned rules such as the support maximization rule, confidence maximization rule, optimized entropy rule, and optimized interclass variance rule, the described process is performed with the condition $\theta$ being appropriately changed.

Further, it is also possible that $v(i, j)$ is changed so as to equalize $v(i, j)/u(i, j)$ of each pixel in the segmented rectilinear region S to the proportion of the number of data in the whole plane, whose true-false attribute is true, to the number of data s in the whole plane, and using the changed $v(i, j)$, a fourth region $S_4$ of pixels maximizing $$\sum_{(i,j) \in S_4} g(i, j) = \sum_{(i,j) \in S_4} (v(i, j) - \theta_4 u(i, j)) \qquad (5)$$

is segmented according to the input condition $\theta_4$. Using this step, a secondary correlation rule can be derived.

Further, it is also possible that the above plane forming step randomly samples X data from a plurality of data, sorts the sampled data for each numeric attribute, stores the X·i/N (i=1, 2, ... N)-th numeric value and X·n/M (n=1, 2, ... M)-th numeric value, and based on the stored numeric values, allocates the plurality of data to N×M pixels. This enables data to be allocated to each row and each column at high speed and almost uniformly.

The region segmentation step is a primary portion of the present invention. A rectilinear region in which the section [s, t] in the m-th column is the rightmost column is classified into any of the four types: (1) widen, (2) up, (3) down, and (4) narrow, as compared with the section [x, y] in the (m−1)-th column, when moving from the (m−1)-th column to the m-th column. And, the rectilinear region of the four types, which has the maximum value of Equation (1), is the desired region. Accordingly, to determine a region having the maximum value of Equation (1) for each type, the following steps are executed.

For the first type, a section [x,y] in the (m−1)-th column of a rectilinear region $S^w_m(s,t)$ whose value of Equation (1) is maximum among first rectilinear regions and second rectilinear regions or information representing that the m-th column is the leftmost column is stored into a storage $H^W$ so as to correspond to m and [s,t]. The section [s,t] in the m-th column of the first rectilinear regions is the rightmost column and the section [x,y] in the (m−1)-th column of the first rectilinear regions is included in the section [s,t]. The second rectilinear regions consist of the section [s,t] in the m-th column. A value of Equation (1) of the rectilinear region $S^w_m(s,t)$ is stored. For the second type, (a) a section [x,y] in the (m−1)-th column and (b) a relationship between the section [x,y] in the (m−1)-th column and a section [a,b] in the (m−2)-th column of a rectilinear region $S^U_m(s,t)$ whose value of Equation (1) is maximum among first rectilinear regions and second rectilinear regions or information representing that the m-th column is the leftmost are stored into a storage $H^u$ so as to correspond to m and section

[s,t]. The section [s,t] in the m-th column of the first rectilinear regions is the rightmost column, and the section [x,y] in the (m−1)-th column of the first rectilinear regions satisfies s≧x and t≧y. The second rectilinear regions consist of the section [s,t] in the m-th column, and a value of Equation (1) of the rectilinear region $S^U_m(s,t)$ is stored.

For the third type, (a) a section [x,y] in the (m−1)-th column and (b) a relationship between the section [x,y] in the (m−1)-th column and a section [a,b] in the (m−2)-th column of a rectilinear region $S^D_m(s,t)$, whose value of Equation (1) is maximum among first rectilinear regions and second rectilinear regions, or information representing that the m-th column is the leftmost, are stored into a storage $H^D$ so as to correspond to m and [s,t]. The section [s,t] in the m-th column of the first rectilinear regions is the rightmost column. The section [x,y] in the (m−1)-th column of the first rectilinear regions satisfies s≦x and t≦y. The second rectilinear regions consist of the section [s,t] in the m-th column, and a value of Equation (1) of the rectilinear region $S^D_m(s,t)$ is stored. Finally, for the fourth type, (a) a section [x,y] in the m−1-th column and (b) a relationship between the section [x,y] in the (m−1)-th column and a section [a,b] in the (m−2)-th column of a rectilinear region $S^N_m(s,t)$, whose value of Equation (1) is maximum among first rectilinear regions and second rectilinear regions, or information representing that the m-th column is the leftmost, are stored into a storage $H^N$ so as to correspond to the m and the [s,t]. The section [s,t] in the m-th column of the first rectilinear regions is the rightmost column. The section [x,y] in the (m−1)-th column of the first rectilinear regions satisfies s≦x and t≦y. The second rectilinear regions consist of the section [s,t] in the m-th column. A value of Equation (1) of said rectilinear region $S^N_m(s,t)$ is stored.

Each step is formed in consideration of the nature of rectilinear. In addition, the first to fourth storing steps is performed for all m and [s, t], and by using m and [s, t] of the rectilinear region S having the maximum value of Equation (1), and the value in the corresponding storage $H^W$, $H^U$, $H^D$, or $H^N$, the rectilinear region S from the plane is segmented.

Further, in the calculation of the second type, (a) a section [x,y] in the (m−1)-th column and (b) a relationship between the section [x,y] in the (m−1)-th column and a section [a,b] in the (m−2)-th column of a rectilinear region $S^U_m(s,t)$ whose value of Equation (1) is maximum among first, second, and third rectilinear regions, or information representing the m-th column is the leftmost column, are stored into the storage $H^u$ so as to correspond to the m and the [s,t]. The section [s,t] in the m-th 0 column of the first rectilinear regions is the rightmost column and the setion [x,y] in the (m−1)-th column of the first regions satisfies s≧x and t=y. The section [a,b] in the (m−2)-th column of the first rectilinear regions satisfies a≧x and b≦y or a≦x and b≦y. The section [s,t] in the m-th column of the second rectilinear regions is the rightmost column. The section [x,y] in the (m−1)-th column of the second rectilinear region satisfies s≧x and s≦y≦t−1. The section [a,b] in the (m−2)-th column of the second rectilinear regions satisfies a≧x and b≦y or a≦x and b≦y. The third rectilinear regions consist of the section [s,t] in the m-th column. The value of Equation (1) of the rectilinear region $S^U_m(s,t)$ are then stored.

Further, in the calculation of the third type, (a) a section [x,y] in the (m−1)-th column and (b) a relationship between the section [x,y] in the (m−1)-th column and a section [a,b] in the (m−2)-th column of a rectilinear region $S^D_m(s,t)$ whose value of Equation (1) is maximum among first, second, and third rectilinear regions, or information representing the m-th column is the leftmost column, are stored into the storage $H^D$ so as to correspond to m and [s,t]. The section [s,t] in the m-th column of the first rectilinear regions is the rightmost column. The setion [x,y] in the (m−1)-th column of the first regions satisfies s=x and t≧y. The section [a,b] in the (m−2)-th column of the first rectilinear regions satisfies a≧x and b≦y or a≧x and b≧y. The section [s,t] in the m-th column of the second rectilinear regions is the rightmost column and the section [x,y] in the (m−1)-th column of the second rectilinear region satisfies s+1≦x≦t and y≦t. The section [a,b] in the (m−2)-th column of the second rectilinear regions satisfies a≧x and b≦y or a≧x and b≧y. The third rectilinear regions consist of the section [s,t] in the m-th column. The value of Equation (1) of the rectilinear region $S^D_m(s,t)$ is then stored.

Further, in the calculation of the fourth type, (a) a section [x,y] in the (m−1)-th column and (b) a relationship between the section [x,y] in the (m−1)-th column and a section [a,b] in the (m−2)-th column of a rectilinear region $S^N_m(s,t)$ whose value of Equation (1) is maximum among first, second, and third rectilinear regions, or information representing the m-th column is the leftmost column, are stored into the storage $H^N$ so as to correspond to m and [s,t]. The section [s,t] in the m-th column of the first rectilinear regions is the rightmost column. The setion [x,y] in the (m−1)-th column of the first regions is the same as the section [s,t] and the section [s,t] in the m-th column of the second rectiliinear regions is the rightmost column, The section [x,y] in the (m−1)-th column of the second rectilinear region satisfies x≦s and y≦t+1 or x≦s−1 and y≦t. The third rectilinear regions consist of the section [s,t] in the m-th column, and the value of Equation (1) of the rectilinear region $S^D_m(s,t)$ is stored.

Moreover, the segementation step comprises the steps of: executing the first to fourth storing steps for all m and [s, t]; and by using m and [s, t] of the rectilinear region S having the largest value of Equation (1), and the corresponding storage $H^W$, $H^U$, $H^D$, or $H^N$, reading out the section [x, y] in the (m−1)-th column and the relation between the (m−1)-th column and (m−2)-th column (the first reading step). In addition, the segmentation step comprises the steps of: by using the relation between the (m−1)-th column and (m−2)-th column, selecting the corresponding storage from the storages $H^W$, $H^U$, $H^D$, and $H^N$ (the selection step); by using the section [x, y] in the (m−1)-th column, reading out the section [a, b] in the (m−2)-th column, and the relation between the (m−2)-th column and the m−3-th column, from the selected storage (the second reading step). Finally, the selection and second reading steps are repeated until the relation with the preceding column becomes information representing the leftmost column.

The invention may also be implemented as an apparatus for carrying out the above methods, or a program for causing a computer to execute such methods. In addition, such a program may be stored in a storage medium or storage device readable by the computer.

Other advantages and features of the present invention will be more apparent through the following description with reference to the accompanied drawings.

BRIEF DESCRIPTION OF THE DRAWING

FIG. 17 shows a typical calculation sequence for $f_m^N(s, t)$;

PREFERRED EMBODIMENT OF THE INVENTION

An embodiment of the present invention is now described in detail in conjunction with the accompanied drawings. The execution of each step in the method of the present invention is first presented.

(1) Plane forming phase

Figure 1:
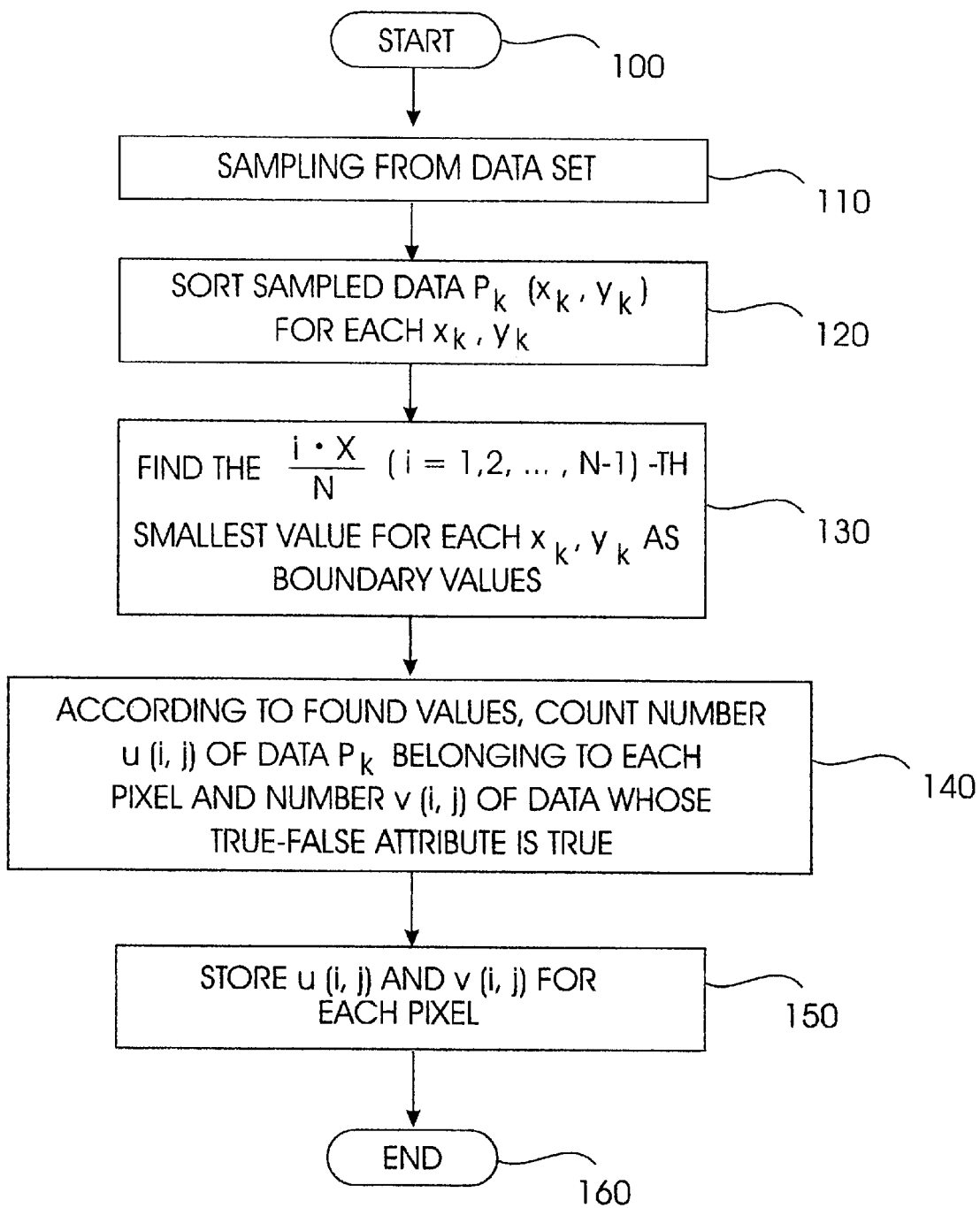
FIG. 1 is a diagram showing the flow of the plane forming step.

Consider a plane spanned by two coordinate axes (x-axis, y-axis) so as to correspond to two numeric attributes of given data. The plane is divided into N pixels on each axis to create $N^2$ pixels on the plane. In FIG. 1, the flow of the plane forming phase is shown. This phase starts at step 100, where data is first randomly sampled from a data set P (step 110). The sampled data is represented as $p_k(x_k, y_k)$ (k=1, 2, . . . X, where $x_k$ and $y_k$ represent the values of the two numeric attributes of data, and X represents the number of the sampled data). Then, a sorting is performed for each of $x_k$ and $y_k$ (step 120), and the i·X/N (i=1, 2, . . . N−1)-th smallest value is found for each of $x_k$ and $y_k$ (step 130). The found value is the boundary value of the pixels of each axis. By carrying out such step, the number of data belonging to each column and each row on the plane becomes approximately uniform.

Then, using the found values, the number u(i, j) of data $p_k$ belonging to a pixel (i, j) and the number v(i, j) of data $p_k$ whose true-false attribute is true are counted (step 140). It is noted that, since u(i, j) and v(i, j) represent the data of a pixel existing at row i and column j on the plane, they represent a pixel at a place advancing by j in the x-axis direction and by i in the y-axis direction. Finally, the counted u(i, j) and v(i, j) are stored for each pixel (step 150). In this way, two N×N matrices, u(i, j) and v(i, j), are generated.

The above random sampling is made because the sorting of all data usually requires much time. However, the sorting of all data may be feasible sometimes. Further, the number of data taken out by the random sampling is preferably about 30N to 50N. Although both axes have been divided into the same number N in the example shown above, they may be divided into different numbers. In the typical example, N is ir the order of 20 to 1000.

Other methods of sampling may be used. For instance, for the boundary value of each pixel, a predetermined value may be used. Further, it may be uniformly divided for the data value, or may be logarithmically divided.

Figure 2:
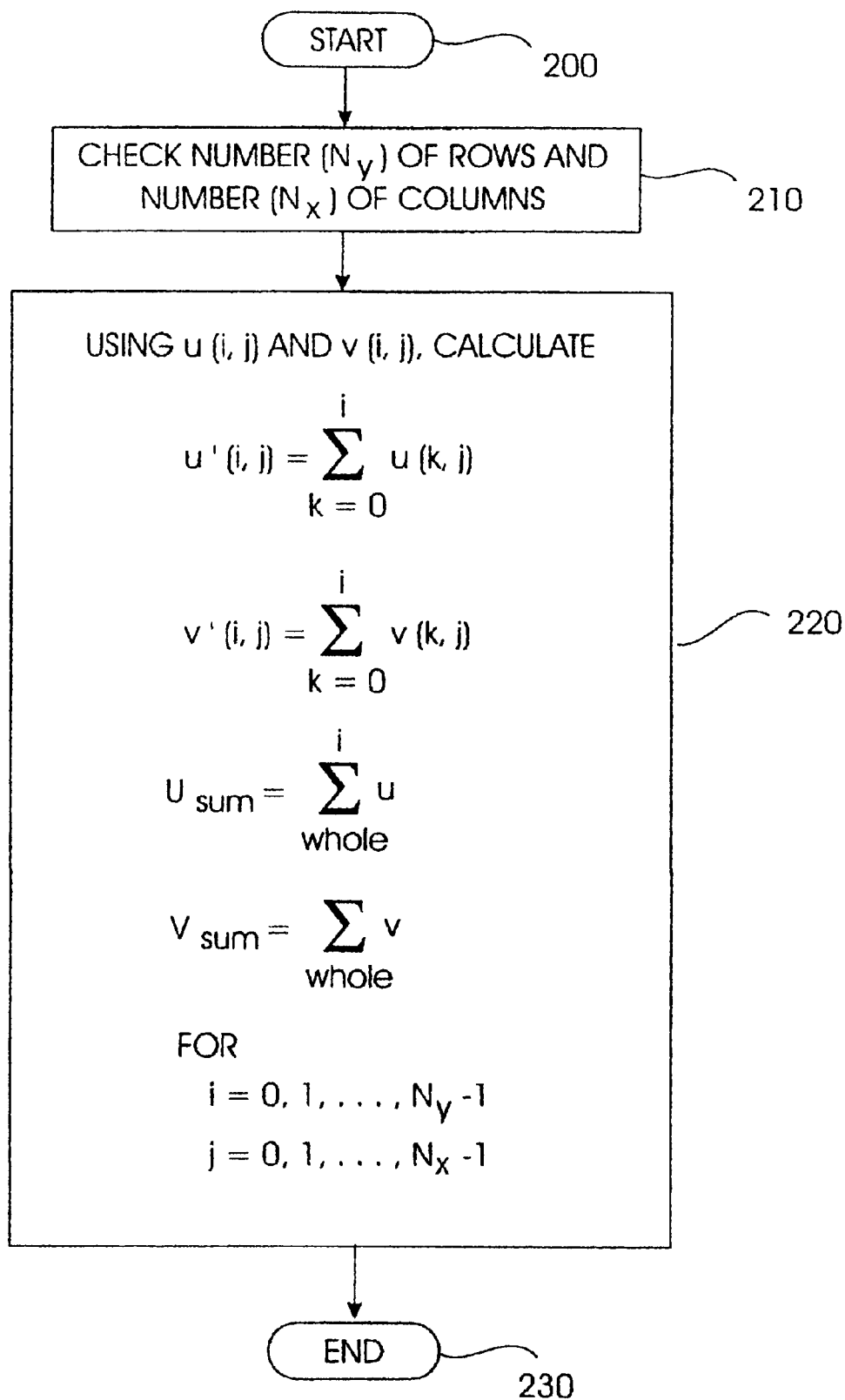
FIG. 2 is a diagram showing the flow of the preparation for the region segmentation step.

Further, if the following processing (FIG. 2) is performed as a preparation to the later processing, the whole process is speeded up. That is, the number of rows ($N_y$) and the number of columns ($N_x$) of u(i, j) and v(i, j) are checked (step 210). Then, using the previously obtained u(i, j) and v(i, j), the following matrix of u'(i, j) and v'(i, j) is newly created (step 220).

$$u'(i, j) = \sum_{k=0}^{i} u(k, j) \tag{6}$$

$$v'(i, j) = \sum_{k=0}^{i} v(k, j) \tag{7}$$

These calculations are performed for all i=0, 1, . . . $N_y$−1 and j=0, 1, . . . $N_x$−1. The u'(i, j) and v'(i, j) are prepared for simplifying as follows the sum calculation of an objective function (hereinafter sometimes referred to as gain), $$g(i,j) = v(i,j) - \theta u(i,j) \tag{8}$$

which is often calculated later.

$$\Gamma m(s, t) = \sum_{k=s}^{t} g(k, m) \tag{9}$$

$$= \begin{cases} v'(t, m) - \theta u'(t, m) & (s = 0) \\ (v'(t, m) - v'(s-1, m)) - \theta(u'(t, m) - u'(s-1, m)) & \\ & (s \geq 1) \end{cases}$$

Further, $$Usum = \sum_{whole} u \tag{10}$$

and $$V_{sum} = \sum_{whole} v \qquad (11)$$

are prepared since they are also often used later. The above preparations speed up the following region segmentation step.

(2) Region segmentation phase

Figure 3:
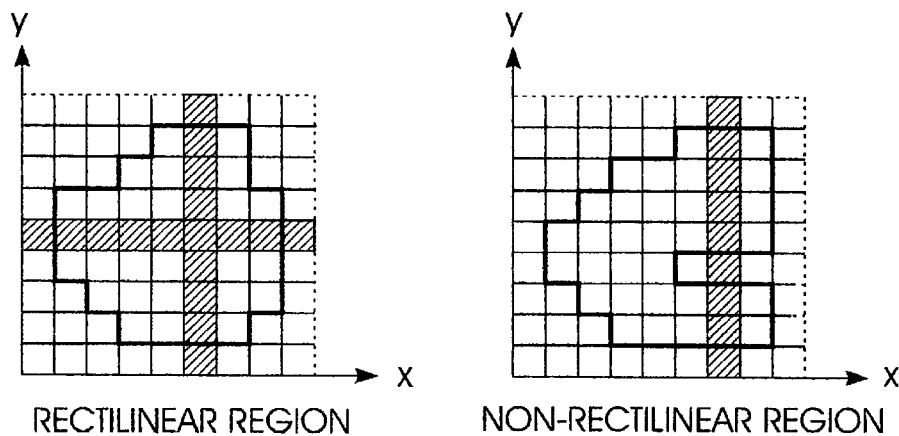
FIG. 3 shows a rectilinear region as compared to a non-rectilinear region.

This phase segments a rectilinear region from the previously created plane. An example of the rectilinear region is shown in FIG. 3 as compared to a non-rectilinear region. The rectilinear region means a region in which (1) the intersections with lines parallel with the y-axis are always continuous or empty, and (2) the intersections with lines parallel with the x-axis are always continuous or empty. The left region of FIG. 3 is a rectilinear region, because the intersections with any line parallel with the y-axis are continuous or empty and the intersections with any line parallel with the x-axis are continuous or empty. On the other hand, in the right region of FIG. 3, the intersections with lines parallel with the x-axis are always continuous or empty, but the intersections with lines parallel with the y-axis include those which are not continuous. Accordingly, this region is not a rectilinear region.

A region satisfying only the condition (1) of rectilinear region shown above is called an x-monotone region, and a region satisfying only (2) is called a y-monotone region. An x-monotone region is segmented in the background art shown above, but, if the background art is actually applied to data mining as in the present invention, a complex region which drastically varies in the vertical direction is often segmented, producing a shape which is difficult for a person to understand. Further, if the segmentation is attempted in any desired shape, the problem becomes NP hard. Thus, in the present invention, a rectilinear region is segmented.

Figure 4:
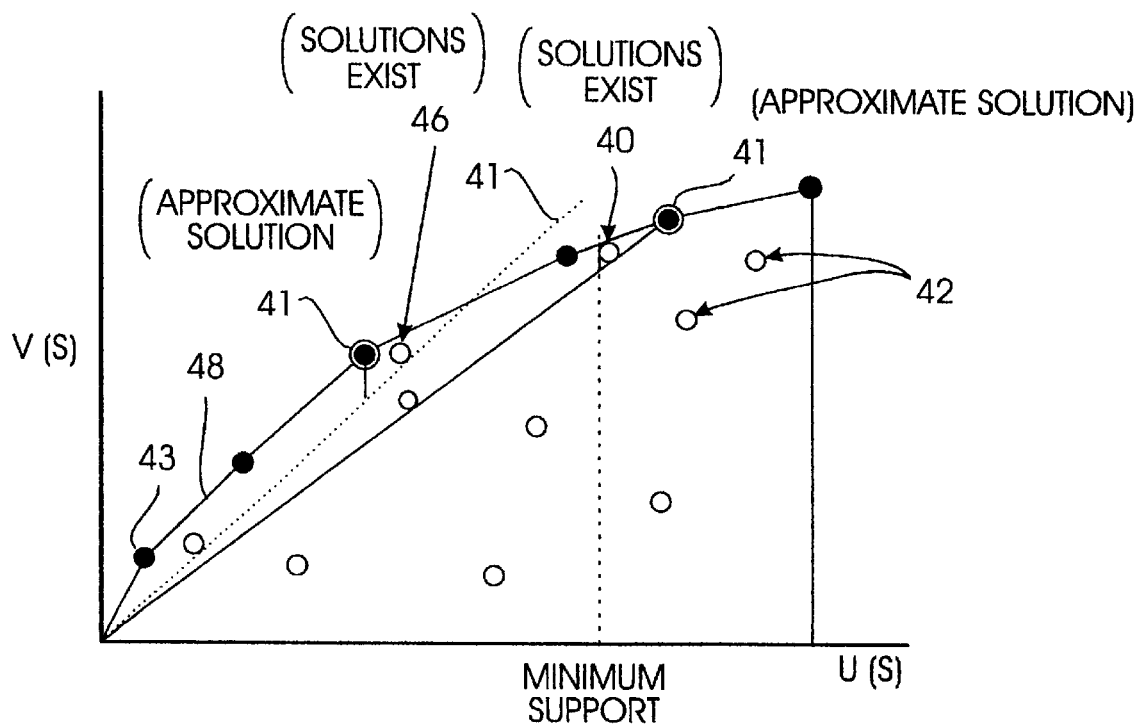
FIG. 4 is a graph illustrating the U(S-)V(S) plane.

In the rectilinear region segmentation, a rectilinear region which maximizes the gain represented by the Equation (8) including a parameter value θ (real number not less than 0 and not greater than 1) for the whole region is segmented. The parameter θ is now described. As shown in FIG. 4, a plane is assumed in which the abscissa represents the number of data U(S) included in a region S to be segmented, and the ordinate represents the number of data V(S) which is included in the region S to be segmented and whose true-false attribute is true. Since there are existing many combinations of the number of data and the number of data whose true-false attribute is true, many points are existing on this plane, and among them, the points forming a convex hull are particularly used. That is, a curve 48 is formed by connecting points forming the convex hull, and a straight line having a gradient θ with respect to the curve is downwardly lowered from the top to obtain the first point at which it contacts with the curve, and the region obtained is output. Points on the convex hull are represented by black circles 43 in FIG. 4. Hereinafter, points on the convex hull are referred to as focused images, and a technique of lowering a straight line is referred to as hand probe. As described above, the present invention employs a method for using the gradient θ as a parameter.

The reason why only the points on the convex hull are treated is that, although the confidence maximization rule and the support maximization rule are not always existing on the convex hull, they can output sufficient points as approximate solutions, and the optimized entropy rule and the optimized interclass variance rule always exist on the convex hull. If the strict solutions of the confidence maximization rule and the support maximization rule will be solved, the calculation is not completed within a practical time, and thus a sufficiently effective result can be output even with approximate solutions.

To lower a straight line having a gradient of θ as described above means that the Y-intercept of a straight line y=θx+Q, namely Q, is decreased. In other words, it is a problem of searching for a point which has U(S) maximizing Q=V(S)−θU(S) on the X-coordinate. Accordingly, it is modified into $$maxQ = \max\left\{\sum_{(i,j)\in S} v(i,j) - \theta \sum_{(i,j)\in S} u(i,j)\right\} \qquad (12)$$

$$= \max \sum_{(i,j)\in S} g(i,j)$$

Figure 5:
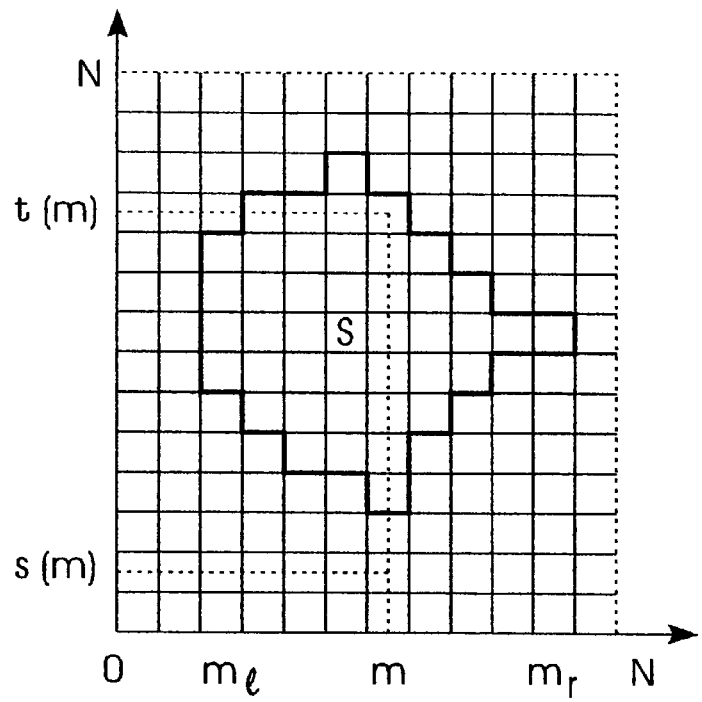
FIG. 5 is a diagram illustrating the notation in the region segmentation step.

Now, consideration is made to how to solve the Equation (12). First, the nature of a rectilinear region is represented by the relation among pixels in the region. S is assumed to be a rectilinear region in a pixel plane. $m_l$ and $m_r$ are assumed to be the column numbers of the left end and the right end of S, respectively. The pixel numbers of the lower end and the upper end of the m-th column ($m_l \leq m \leq m_r$) of S are assumed to be s(m) and t(m), respectively. These positional relationships are shown in FIG. 5. The tendency of change of the section [s(m), t(m)] in the m-th column is defined as follows by comparison with the section in the (m−1)-th column.

Figure 6:
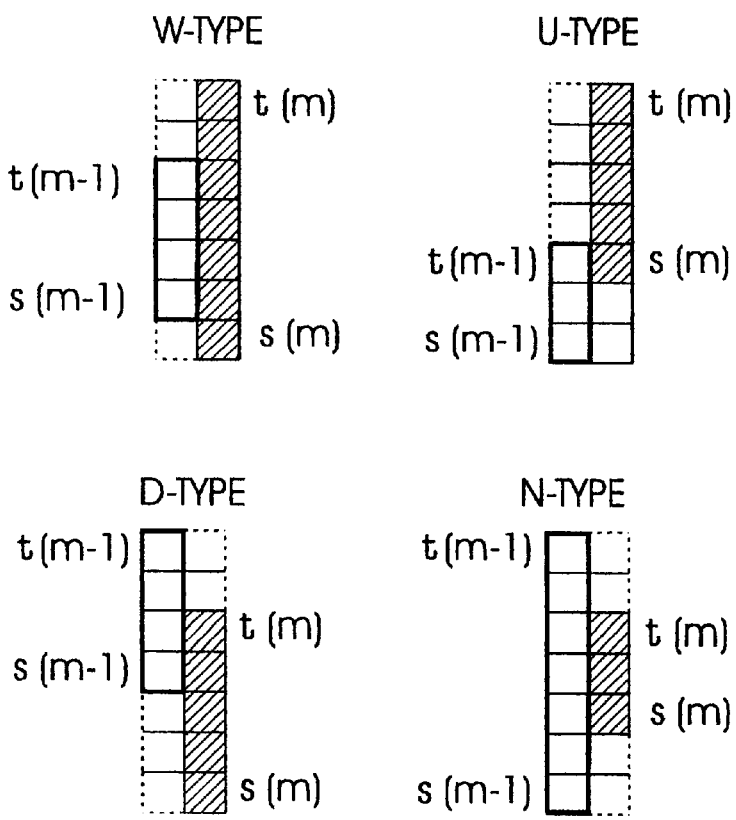
FIG. 6 is a diagram showing the change tendency from the (m−1)-th column to the m-th column.

(a) W-Type: Widen type (upper-left of FIG. 6) for s(m−1)≧s(m), t(m−1)≦t(m)

(b) U-Type: Up type (upper-right of FIG. 6) for s(m−1)≦s(m), t(m−1)≦t(m)

(c) D-Type: Down type (lower-left of FIG. 6) for s(m−1)≧s(m), t(m−1)≧t(m)

(d) N-Type: Narrow type (lower-right of FIG. 6) for s(m−1)≦s(m), t(m−1)≧t(m)

A column of $m=m_l$ belongs to the total change tendency, and if the equality signs in the above inequalities are valid, the particular column belongs to a plurality of change tendencies at the same time. From the above definition, the section of any column in a rectilinear region belongs to any of the above four types.

Further, from the nature of the rectilinear region, the change tendency of the left adjacent column of a column having a certain change tendency satisfies the following conditions. That is, (1) The left adjacent column of W-Type is W-Type.

(2) The left adjacent column of U-Type is W-Type or U-Type.

(3) The left adjacent column of D-Type is W-Type or D-Type.

(4) The left adjacent column of N-Type is W-Type or U-Type, or D-Type, or N-Type.

Figure 7:
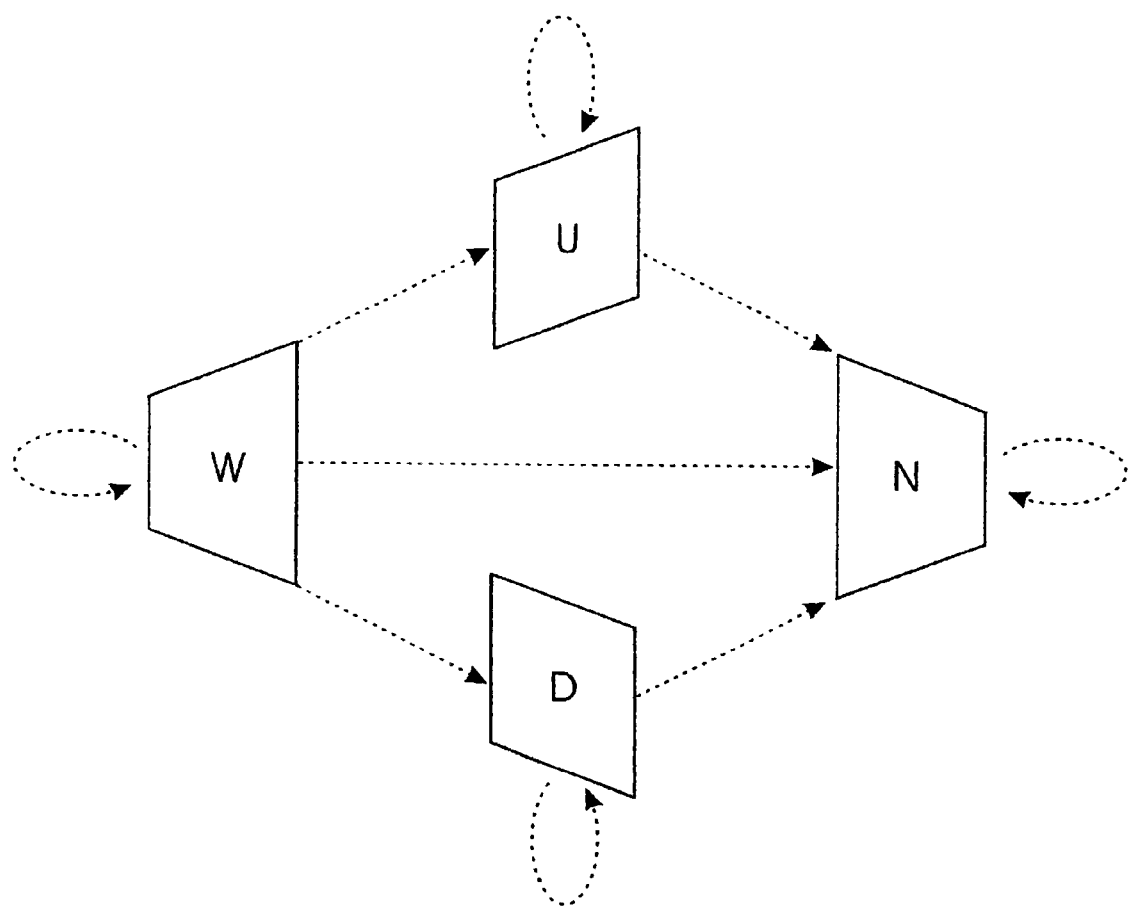
FIG. 7 is a diagram representing the state transition of each column of a rectilinear region.

Conversely, regions satisfying such conditions are rectilinear regions. These conditions are shown in FIG. 7 as a state transition diagram. W, U, D, and N in the figure are W-Type, U-Type, D-Type, and N-Type, respectively, and each tracing of an arrow means transition to the state of one right adjacent column.

All rectilinear regions can be classified into the above shown four types by the change tendency of the rightmost column of the region. The four types are generically called X-type (X∈{W, U, D, N}). Similarly to the type of the section of a column, the type of a region may belong to a plurality of types at the same time.

Further, the maximum value of the gains of rectilinear regions of the X-type whose right end is the section [s, t] in the m-th column is represented as $f_m^X(s, t)$. And, the largest gain of the four types' regions is represented as $f_m(s, t)$. That is, it is $$f_m(s,t) = \max\{f_m^W(s,t), f_m^U(s,t), f_m^D(s,t), f_m^N(s,t)\} \qquad (13)$$

These $f_m(s, t)$ are determined for $m=0 \ldots, N_x-1$ ($\forall (s \leq t)$), and the largest of them is selected, then it is the maximum value of the gains of the all rectilinear regions on the above plane. To determine the maximum value, a course of sequentially calculating all $f_m(s, t)$ ($\forall (s \leq t)$) for all $m=0, \ldots, N_x-1$ is taken. Then, for $m=1$, that is, $f_0^x(s, t)$ of the first column is calculated. In this case, it is the same for all types. This is obtained by $$f_0^x(s,t) = \Gamma_0(s,t)$$
$$= \forall x \in \{W, U, D, N\}$$
$$= \forall (s \leq t) \qquad (14)$$

Then, $f_{m-1}^x(s, t)$ ($\forall (X_\epsilon\{w, U, N, D\}, (\forall (s \leq t)))$) is determined. A description of each type is now given.

(a) Widen type (W-Type)

The maximum value $f_m^W(s, t)$ of the gains of rectilinear regions in which the section [s, t] in the m-th column is the rightmost end and the m-th column is W-Type is determined by the following expression.

$$f_m^W(s, t) = \max \begin{cases} \Gamma_m(s, t) & (1) \\ f_{m-1}^W(s, t) + \Gamma_m(s, t) & (2) \\ f_m^W(s, t-1) + g(t, m) & (s < t) \quad (3) \\ f_m^W(s+1, t) + g(s, m) & (s < t) \quad (4) \end{cases} \qquad (15)$$

To obtain max, comparison is made only for the expressions (1) and (2) of the Equation (15) if s=t, and the larger value is used. For other cases, the largest value from expressions (1)–(4) of Equation (15) is used. Expression (1) of Equation (15) represents the gain of a region (vertical rectangle of a width 1) consisting only of the section [s, t] of the m-th column. Further, expression (2) represents the largest gain of the regions in which the (m−1)-th column is W-Type, its section is [s, t], and the m-th column is the right end at the section [s, t]. This corresponds to the shape shown in part (a) of FIG. 8. In addition, from the nature of the rectilinear region, if the m-th column is W-type, it is determined that the (m−1)-th column is W-Type.

Furthermore, expression (3) represents the largest gain of the regions in which the (m−1)-th column is W-Type, its section [s(m−1), t(m−1)] satisfies s(m−1)≧s, t(m−1)≦t−1, and the section [s, t] of the m-th column is the right end. This corresponds to the shape shown in part (b) of FIG. 8. The upper end of the (m−1)-th column is not greater than t−1, and the lower end is not smaller than s. The expression (4) represents the largest gain of the regions in which the (m−1)-th column is W-Type, its section [s(m−1), t(m−1)] satisfies s(m−1)≧s+1, t(m−1)≦t, and the section [s, t] of the m-th column is the right end. This corresponds to the shape shown in part (c) of FIG. 8. The upper end of the (m−1)-th column is not greater than t, and the lower end is not smaller than S+1. The expressions (2) to (4) take into consideration that the left column adjacent to W-Type cannot be any other type than W-Type.

The above calculation of $f_m^W(s, t)$ is performed for all the sections [s, t] in one column. This calculation is represented by the pseudo-code of FIG. 9. As described above, the largest gain is obtained of the regions in which the m-th column is the right end of the region and the change tendency from the (m−1)-th column is W-Type.

(b) Up type (U-type)

First, the values of the following expressions are determined.

$$\beta_{m-1}^W(s, t) = \left\{ i \left| \max_{i \leq s} f_{m-1}^W(i, t) \right. \right\} \qquad (16)$$

$$\beta_{m-1}^U(s, t) = \left\{ i \left| \max_{i \leq s} f_{m-1}^U(i, t) \right. \right\} \qquad (17)$$

Figures 8, 9, 10:
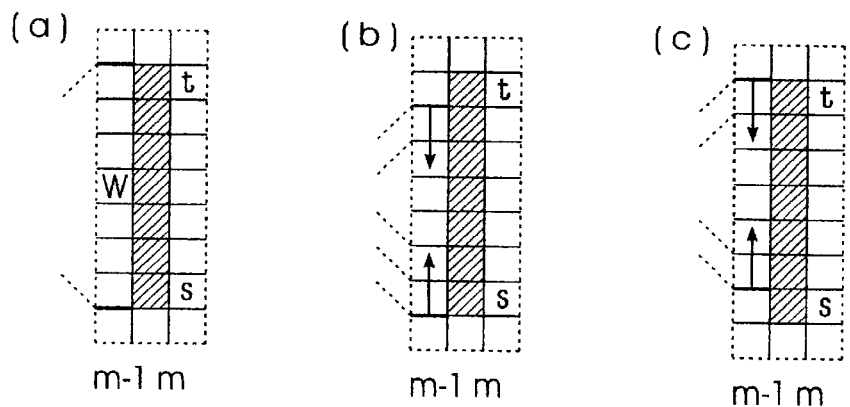
FIG. 8 is a diagram showing the relationship between the m-th column and the (m−1)-th column in the W-Type, in reference to parts (2), (3), and (4) of Equation(15)
FIG. 9 illustrates a typical calculation sequence for $f_m^W(s, t)$.
FIG. 10 illustrates typical pseudo-code for calculating the U-Type.

This calculation is represented by the pseudo-code of FIG. 10.

Using the above calculation, the maximum value $f_m^U(s, t)$ of the gains of the rectilinear regions in which the section [s, t] of the m-th column is the rightmost end and the m-th column is U-type is obtained from the following expression.

$$f_m^U(s, t) = \max \begin{cases} \Gamma_m(s, t) & (1) \\ f_{m-1}^W(\beta_{m-1}^W(s, t), t) + \Gamma_m(s, t) & (2) \\ f_{m-1}^U(\beta_{m-1}^U(s, t), t) + \Gamma_m(s, t) & (3) \\ f_m^U(s, t-1) + g(t, m) & (s < t) \quad (4) \end{cases} \qquad (18)$$

The expressions (1) to (3) in Equation(18) are used for determining whether s=t, while the expression (4) is not used in such case. The expression (1) of the Equation(18) represents the gain of a region (vertical rectangle of a width 1) consisting only of the section [s, t] of the m-th column. Further, the expression (2) represents the largest gain of the regions in which the (m−1)-th column is W-Type, its section [s(m−1), t(m−1)] satisfies s(m−1)≦s, t(m−1)=t, and the m-th column is the right end at the section [s, t]. This corresponds to the shape shown in part (a) of FIG. 11. The upper limit of the lower end of the (m−1)-th column is s.

The expression (3) in Equation(18) represents the largest gain of the regions in which the (m−1)-th column is U-Type and its section [s(m−1), t(m−1)] satisfies s(m−1)≦s, t(m−1)=t. The m-th column is the right end at the section [s, t]. This corresponds to the shape shown in part (b) of FIG. 11. The upper end of the lower end of the (m−1)-th column is s. The expression (4) represents the largest gain of the regions in which the (m−1)-th column is W-Type or U-Type, its section [s(m−1), t(m−1)] satisfies s(m−1)≦s, s≦t(m−1)≦t−1, and the m-th column is the right end at the section [s, t]. This corresponds to the shape shown in part (c) of FIG. 11. The upper limit of the lower end of the (m−1)-th column is s, and the range of the upper end is not smaller than s and not greater than t−1. The expressions (2) to (4) take into consideration that the left adjacent column to U-Type cannot be any other type than W-Type or U-Type.

The above calculation of $f_m^U(s, t)$ is performed for all the sections [s, t] in one column. This calculation is represented by the pseudo-code of FIG. 12. Thus, the largest gain is obtained of the regions in which the m-th column is the right end of the region and the change tendency thereof is U-Type.

(c) Down type (D-Type)

First, the values of the following expressions are calculated.

$$\tau_{m-1}^W(s, t) = \left\{ i \left| \max_{i \geq t} f_{m-1}^W(s, i) \right. \right\} \qquad (19)$$

-continued $$\tau_{m-1}^D(s, t) = \left\{ i \middle| \max_{i \geq t} f_{m-1}^D(s, i) \right\} \quad (20)$$

Figures 11, 12, 13:
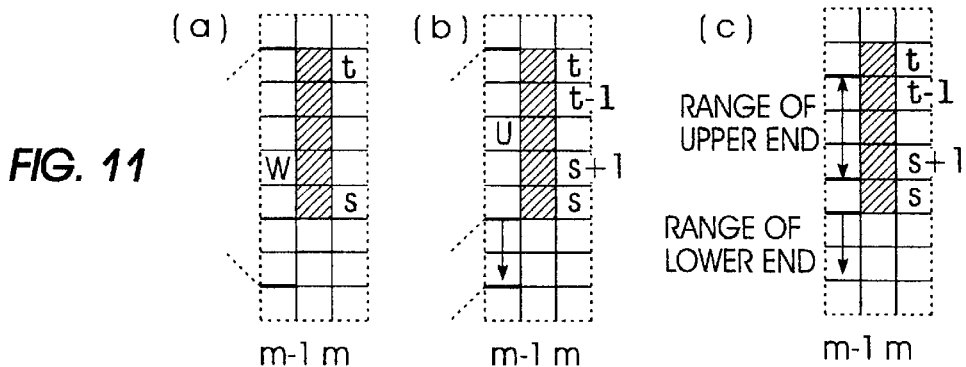
FIG. 11 illustrates the relationship between the m-th column and the (m−1)-th column in the U-Type, in reference to parts (2), (3), and (4) of Equation(18)
FIG. 12 shows a typical calculation sequence for $f_m^U(s, t)$.
FIG. 13 represents typical pseudo-code for calculating the D-Type.

These calculations are carried out, for example, by the algorithm shown in FIG. 13. The expressions (1) to (3) in Equation(18) are used for comparing whether s=t, and the expression (4) is not used in such case.

Using the above calculations, the maximum value $f_m^D(s, t)$ of the gains of the rectilinear regions in which the section [s, t] of the m-th column is the rightmost end and the m-th column is D-Type is determined from the following expression.

$$f_m^D(s, t) = \max \begin{cases} \Gamma_m(s, t) & (1) \\ f_{m-1}^W(s, \tau_{m-1}^W(s, t)) + \Gamma_m(s, t) & (2) \\ f_{m-1}^D(s, \tau_{m-1}^D(s, t)) + \Gamma_m(s, t) & (3) \\ f_m^D(s+1, t) + g(s, m) \quad (s < t) & (4) \end{cases} \quad (21)$$

Figures 14, 15:
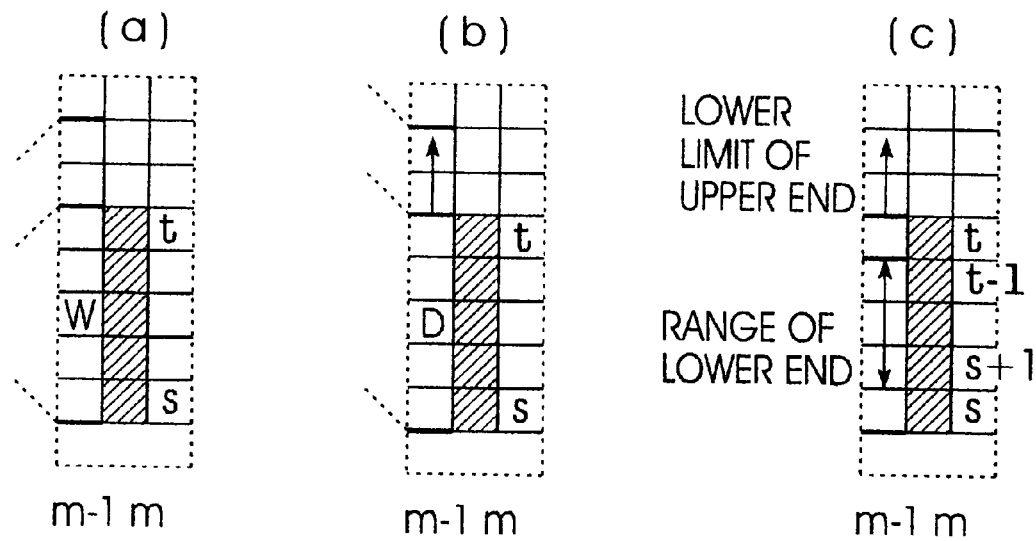
FIG. 14 shows the relationship between the m-th column and the (m−1)-th column in the D-Type.
FIG. 15 shows a calculation sequence for $f_m^D(s, t)$.

The expression (1) of the Equation (21) represents the gain of a region (vertical rectangle of a width 1) consisting only of the section [s, t] of the m-th column. Further, the expression (2) represents the largest gain of the regions in which the (m−1)-th column is W-Type, its section [s(m−1), t(m−1)] satisfies s(m−1)=s, t(m−1)≧t, and the m-th column is the right end at the section [s, t]. This corresponds to the shape shown in part (a) of FIG. 14. The lower limit of the upper end of the (m−1)-th column is t.

The expression (3) represents the largest gain of the regions in which the (m−1)-th column is D-Type, its section [s(m−1), t(m−1)] satisfies s(m−1)=s and t(m−1)≧t, and the m-th column is the right end at the section [s, t]. This is for the shape shown in part (b) of FIG. 14. The lower limit of the upper end of the (m−1)-th column is t. The expression (4) represents the largest gain of the regions in which the (m−1)-th column is W-Type or D-Type, its section [s(m−1), t(m−1)] satisfies s+1≦s(m−1)≦t and t(m−1)≧t, and the m-th column is the right end at the section [s, t]. This is for the shape shown in part (c) of FIG. 14. The lower limit of the upper end of the (m−1)-th column is t, and the range of the lower end is not smaller than s+1 and not greater than t. The expressions (2)–(4) in Equation(21) take into consideration that the left adjacent column to D-Type cannot be any other type than W-Type or D-Type.

The above calculation of $f_m^D(s, t)$ is performed for all the sections [s, t] in one column. This calculation follows the algorithm of FIG. 15. Thus, the largest gain is obtained of the regions in which the m-th column is the right end of the region and the change tendency thereof is D-Type.

(d) Narrow type (N-Type)

The following expression gives the maximum value $f_m^N(s, t)$ of the gains of the rectilinear regions in which the section [s, t] of the m-th column is the rightmost end and the m-th column is N-Type.

$$f_m^N(s, t) = \max \begin{cases} \Gamma_m(s, t) & (1) \\ f_{m-1}^W(s, t) + \Gamma_m(s, t) & (2) \\ f_{m-1}^U(s, t) + \Gamma_m(s, t) & (3) \\ f_{m-1}^D(s, t) + \Gamma_m(s, t) & (4) \\ f_m^N(s, t+1) + \Gamma_m(s, t) & (5) \\ f_m^N(s, t+1) - g(t+1, m) \quad (t < N_y - 1) & (6) \\ f_m^N(s-1, t) - g(s-1, m) \quad (s > 0) & (7) \end{cases} \quad (22)$$

When max is determined, each expression is used only if the condition at the end of the expression is satisfied. That is, the expression (6) in Equation(22) is compared only when $t > N_y - 1$ is satisfied, and the expression (7) is used for comparison only if s>0 is satisfied.

Figures 16, 18:
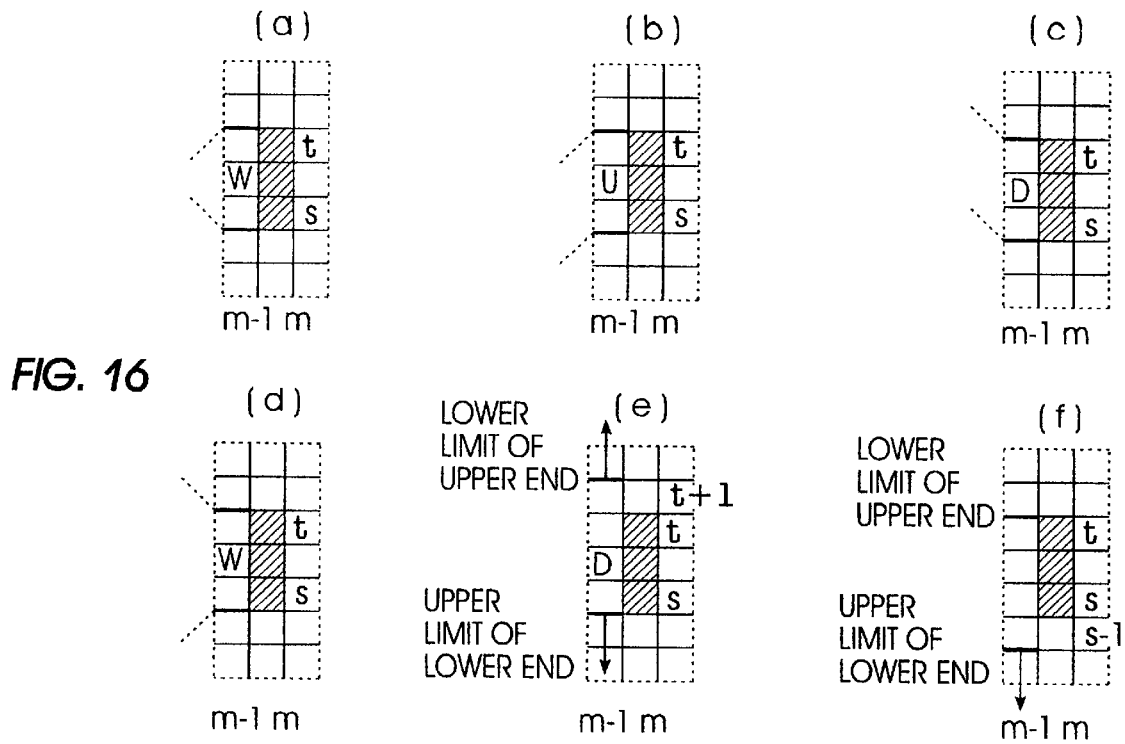
FIG. 16 shows the relationship between the m-th column and the (m−1)-th column in the N-Type, in reference to parts (1), and (3–7) of Equation(22)
FIG. 18 shows a data structure for $H^X(m, [s, t])$.

The expression (1) of the Equation (22) represents the gain of a region (vertical rectangle of a width 1) consisting only of the section [s, t] of the m-th column. The expression (2) represents the largest gain of the regions in which the (m−1)-th column is W-Type, its section is [s, t], and the m-th column is the right end at the section [s, t]. This is for the shape shown in part (a) of FIG. 16. The expression (3) represents the largest gain of the regions in which the section [s, t] of the (m−1)-th column is U-Type and the m-th column is the right end at the section [s, t]. This is for the shape shown in part (b) of FIG. 16. The expression (4) represents the largest gain of the regions in which the section [s, t] of the (m−1)-th column is D-Type, and the m-th column is the right end at the section [s, t]. This is for the shape shown in part (c) of FIG. 16. The expression (5) represents the largest gain of the regions in which the section [s, t] of the (m−1)-th column is N-Type, its section is [s, t], and the m-th column is the right end at the section [s, t]. This is for the shape shown in part (d) of FIG. 16.

The expression (6) in Equation(22) represents the largest gain of the regions in which the (m−1)-th column is W-Type, U-Type, D-Type, or N-Type. Its section [s(m−1), t(m−1)] satisfies s(m−1)≦s and t(m−1)≧t+1, and the m-th column is the right end at the section [s, t]. This is for the shape shown in part (e) of FIG. 16. The lower limit of the upper end of the (m−1)-th column is t+1, and the upper limit of the lower end is s. The expression (7) represents the largest gain of the regions in which the (m−1)-th column is W-Type, U-Type, D-Type, or N-Type, its section [s(m−1), t(m−1)] satisfies s(m−1)≦s−1 and t(m−1)≧t, and the m-th column is the right end at the section [s, t]. This is for the shape shown in part (f) of FIG. 16. The lower limit of the upper end of the (m−1)-th column is t, and the upper limit of the lower end is s−1.

The above calculation of $f_m^N(s, t)$ is performed for all the sections [s, t] in one column. This calculation is represented by the pseudo-code of FIG. 17. Thus, the largest gain is obtained of the regions in which the section [s, t] of the m-th column is the right end of the region and the change tendency thereof is N-Type.

By the above described calculations (a) to (d), the largest gain of the regions in which the section [s, t] of each column is the right end can be calculated, but the region itself needs to be stored at the same time. This is because the data included in the obtained rectilinear region is taken out in the later output step.

If there are several regions having the same maximum value, the one which was found first is treated as the solution. Further, the regions are expressed as [s(m_1), t(m_1)], . . . [s(m_r), t(m_r)], which shows that vertical sections are laterally arranged. Since one column includes $N_y$ rows, the total number of sections [s, t] (s≦t) is $N_y(N_y+1)/2$. Each section [s, t] is made to correspond to one integer p in a one-to-one relationship.

For instance, by the following function h(s, t), a section [s, t] can be made to correspond to one integer p=h(s, t). That is, $$h(s, t) = S + \frac{t(t+1)}{2} \quad (23)$$

Conversely, from the integer p ($0 \leq p \leq N_y(N_y+1)/2$) representing a section, the section [s, t] is determined as follows.

$$t = \left\lfloor \frac{-1 + \sqrt{1 + 8p}}{2} \right\rfloor \quad (24)$$

$$S = P - \frac{t(t+1)}{2} \quad (25)$$

However, such calculation is not used for determining which region has the largest gain. Hereinafter, [s, t] is treated as the same as one integer. Further, the above Equation (23) is merely an example, and there is no problem if other functions are used. Then, arrays in which regions are stored are prepared. They are integer-type two-dimensional arrays of $N_xN_y(N_y+1)/2$, which are prepared for each of the W, U, D, and N-Types. This element is represented by $H^X(m, [s, t])$ ($0 \leq m \leq N_x-1$, $0 \leq [s, t] \leq N_y(N_y+1)/2$, $X \in \{W, U, D, N\}$). In the element $H^X(m, [s, t])$, the section [x, y] in the (m−1)-th column of a region whose gain is $f_m^X(s, t)$, and a numeric value representing the change tendency Y of the (m−1)-th column from the (m−2)-th column are stored. Hereinafter, it is represented by $H^X(m, [s, t]) = Y:[x, y]$. For instance, this $H^X(m, [s, t])$ is expressed by 32 bits of integer type, and the portion of Y is expressed by two upper bits, and the remaining lower bits are used to represent [x, y] (refer to FIG. 18).

However, if the m-th column is the leftmost column, a value representing the left end of the region is stored in the lower bits to show that the m-th column does not connect with the (m−1)-th column. For instance, in an example in which a section is expressed by the above Equation(25), a value equal to or greater than $N_y(N_y+1)/2$ is placed in the lower bits, or the 29-th bit is used as a flag representing the left end of the region.

Figure 19:
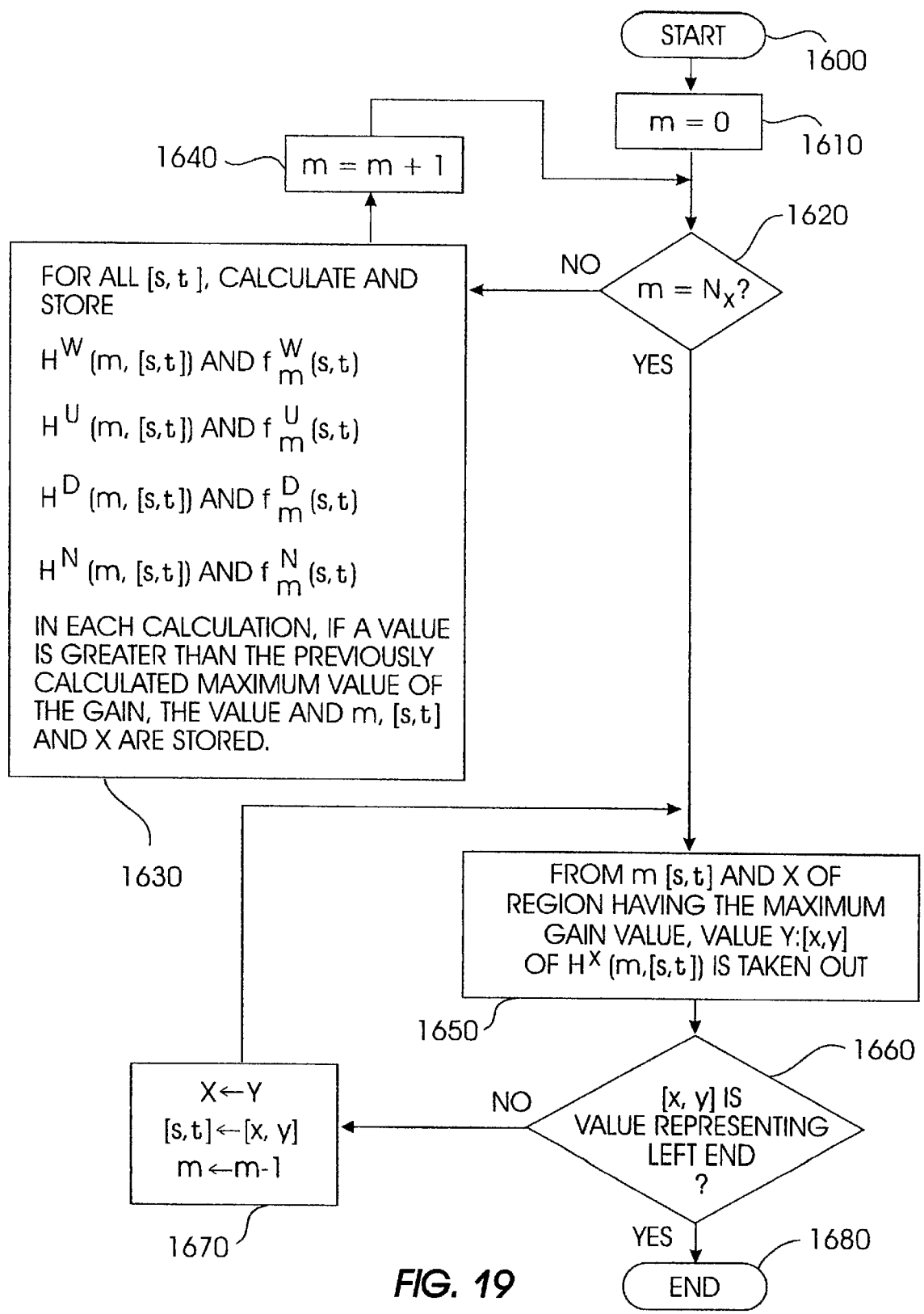
FIG. 19 represents the flow of a typical implementation of the region-segmentation step.

Now, the process for finally determining a rectilinear region having the largest gain is described using FIG. 19. The process started at step 1600 initializes m by m=0 (step 1610). Then, it is determined whether m=$N_x$ (step 1620). This is to determine whether m has reached $N_x$ and the following calculation has been completed for all the columns. If the calculation has not been completed for all the columns m, $H^W(m, [s, t])$ and $f_m^W(s, t)$, $H^U(m, [s, t])$ and $f_m^U(s, t)$, $H^D(m, [s, t])$ and $f_m^D(s, t)$, and $H^N(m, [s, t])$ and $f_m^N(s, t)$ are calculated for all [s, t], and the result is stored. The sequence of this calculation is arbitrary. Then, if, during each calculation, a value greater than the maximum value of the previously calculated gains is calculated, that value and its m, [s, t], and X are stored (step 1630).

The calculation of $H^W(m, [s, t])$ and $f_m^W(s, t)$ can be provided by carrying out the calculation of the previously shown Equation(15). Accordingly, $H^W(m, [s, t])$ becomes a value representing the left end of the region if the expression (1) of the Equation (15) is maximum, W:[s, t] if the expression (2) is maximum, $H^W(m, [s, t−1])$ if the expression (3) is maximum, and $H^W(m, [s+1, t])$ if the expression (4) is maximum. As described above, if only $H^W(m, [s, t])$ is considered, the preceding (m−1)-th column is always W-Type, and thus it is not necessary to store the change tendency of the (m−1)-th column from the (m−2)-th column.

Further, the calculation of $H^U(m, [s, t])$ and $f_m^U(s, t)$ can be provided by carrying out the calculation of the previously shown Equation (18). Accordingly, in $H^U(m, [s, t])$, a value representing the left end of the region is stored if the expression (1) of the Equation (18) is maximum, W:[$\beta_{m-1}^W$(s, t), t] if the expression (2) is maximum, U:[$\beta_{M-1}^U$(s, t), t] if the expression (3) is maximum, and $H^U(m, [s, t−1])$ if the expression (4) is maximum.

The calculation of $H^D(m, [s, t])$ and $f_m^D(s, t)$ can be provided by carrying out the calculation of the previously shown Equation (21). Accordingly, in $H^D(m, [s, t])$, a value representing the left end of the region is stored if the expression (1) of the Equation (21) is maximum, W:[S, $T_{m-1}^W$(s, t)] if the expression (2) is maximum, D:[S, $T_{m-1}^D$(s, t)] if the expression (3) is maximum, and $H^D(m, [s+1, t])$ if the expression (4) is maximum.

Finally, the calculation of $H^N(m, [s, t])$ and $f_m^N(s, t)$ can be provided by carrying out the calculation of the previously shown Equation (22). Accordingly, in $H^N(m, [s, t])$ a value representing the left end of the region is stored if the expression (1) of the Equation (22) is maximum, W:[s, t] if the expression (2) is maximum, U:[s, t] if the expression (3) is maximum, and D:[s, t] if the expression (4) is maximum, N:[s, t] if the expression (5) is maximum, $H^N(m, [s, t+1])$ if the expression (6) is maximum, and $H^N(m, [s−1, t])$ if the expression (7) is maximum.

As seen from the foregoing, i is not necessary to store all $f_m^X(s, t)$. When the calculation of the m-th column is carried out, only the calculation results of the m-th column and the (m−1)-th column are used. Accordingly, only a storage capacity for two columns is required for each of the W, U, D, and N-Types. However, all $f_m^X(s, t)$ may be stored if there is a sufficient storage.

When step 1630 of FIG. 19 ends, m is incremented by one (step 1640), and the process returns to step 1620. Then, this process is executed for all the columns. If executed for all the columns, from m, [s, t], and X regarding the region having the largest gain value for all the columns, $H^X(m, [s, t])$ is referenced and its value Y:[x, y] is taken out (step 1650). Up to this point, the m-th column that is the rightmost column, the section [s, t] of that column, and the (m−1)-th column and its section [x, y] have been found. Then, since the region may be the left end at the (m−1)-th column, it is determined whether [x, y] is a value representing the left end (step 1660). If it is the left end, the process terminates at this point (step 1680). If it is not the left end, Y is substituted into X, [x, y] into [s, t], and (m−1) into m(step 1670), and then the process returns to step 1650. By repeating this process until [x, y] becomes a value representing the left end, the section of each column of the rectilinear region having the largest gain value can be obtained.

(3) Output step

Since which portion of the above plane is occupied by the rectilinear region S determined as described above is known from the previous steps, the data belonging to the region S is taken out. Usually, each data has not only a true-false attribute and numeric attributes, but also other attributes. Thus, if a direct mail is sent, attributes such as address and name are taken out. Since the data to be taken out has been identified up to this point and i is merely a usual database retrieval, a more detailed description is not provided. Naturally, the rectilinear region may be presented to the user after it is once put in a form which enables its outer shape to be clearly seen.

By carrying out each step as described above, one of the association rules between data for a certain condition θ can be determined. A related issue is how to set this condition θ. Generally, it is often the case that the problem is not solved with only one condition θ. The following shows how to derive the previously described four general rules and other rules by using each step above, particularly the region segmentation step, as an engine.

A. Determination of rectilinear regions existing in a certain section

Figure 20:
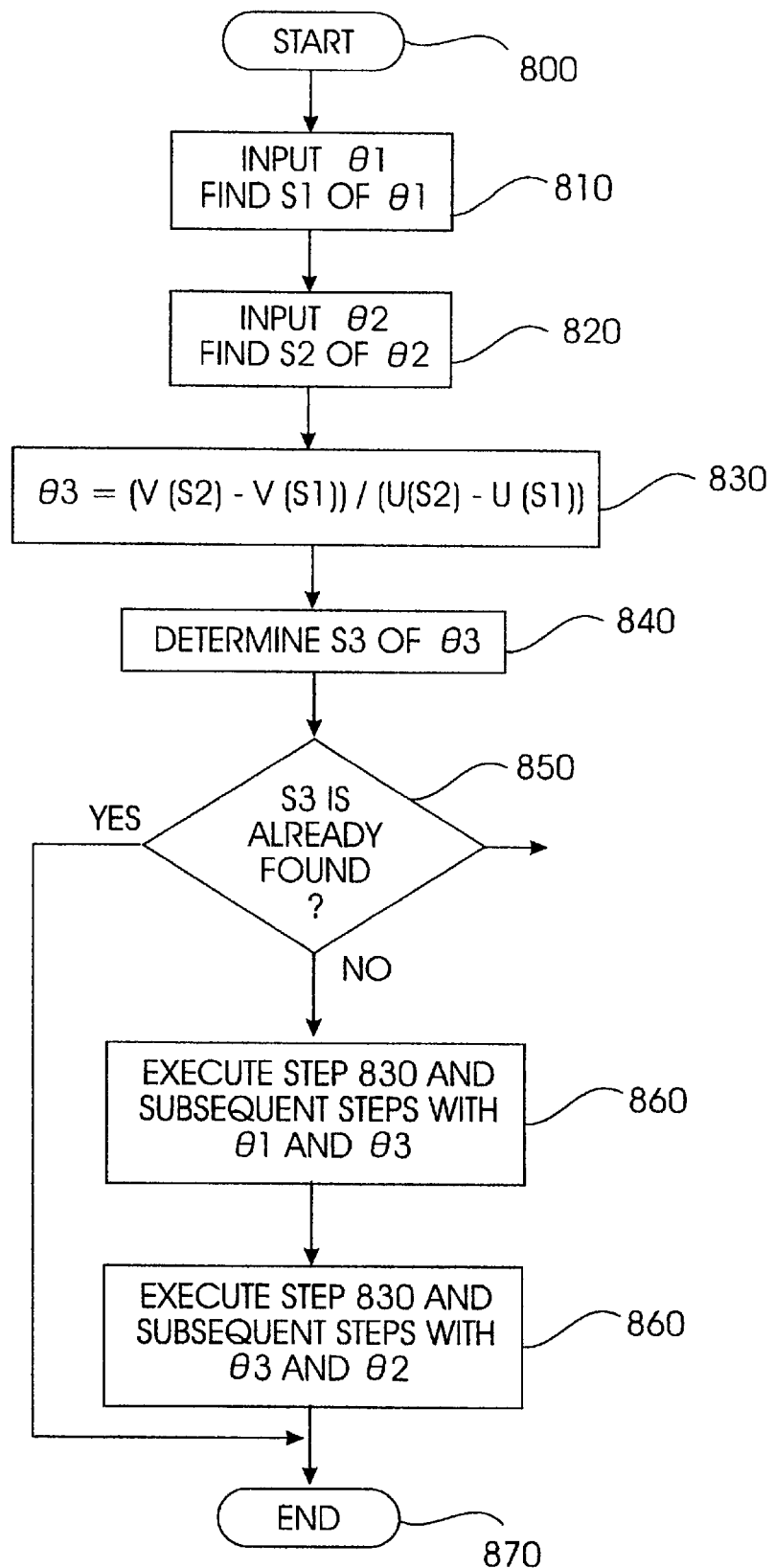
FIG. 20 represents the flow of a typical process for finding a plurality of focused images.

First, consider a following case: by continuously presenting focused images S corresponding to several θ to make a motion picture, the user determines the size and shape of a region to be segmented. This process is shown in FIG. 20. The process started at step 800 finds a focused image S1 by the above described process upon the input θ1 (step 810). Further, it prompts the user to input θ2 for similarly finding a focused image S2 (step 820). When the two focused images are determined in this way, using the numbers U(S1) and U(S2) of data included in the respective ones and the numbers V(S1) and V(S2) of data whose true-false attribute is true, a new gradient θ3 at the middle of them is calculated (step 830).

If the new θ3 is so determined, a focused image S3 corresponding to this θ3 can further be determined (step 840). If the calculated S3 is already determined at this point, no additional focused image exists on the convex hull (FIG. 4) in a section (θ1, θ2). Accordingly, the process terminates (step 880). However, if not already found, using θ3 instead of θ2, step 830 and subsequent steps are executed (step 860). That is, the focused images existing in a section (θ1, θ3) are found. It is also possible to calculate intermediate values one by one. Further, the calculation may be stopped when a certain number of focused images are found. Furthermore, to calculate focused images for remaining one section (θ3, θ2), step 830 and the subsequent steps are executed for θ3 and θ2 (step 870). Also in this case, all the focused images existing in this section may be found, or the process may be terminated when a predetermined number of focused images are found.

Thus, one or more of focused images can be found. It is also possible that a plurality of focused images so obtained can be continuously presented to the user.

Figure 21:
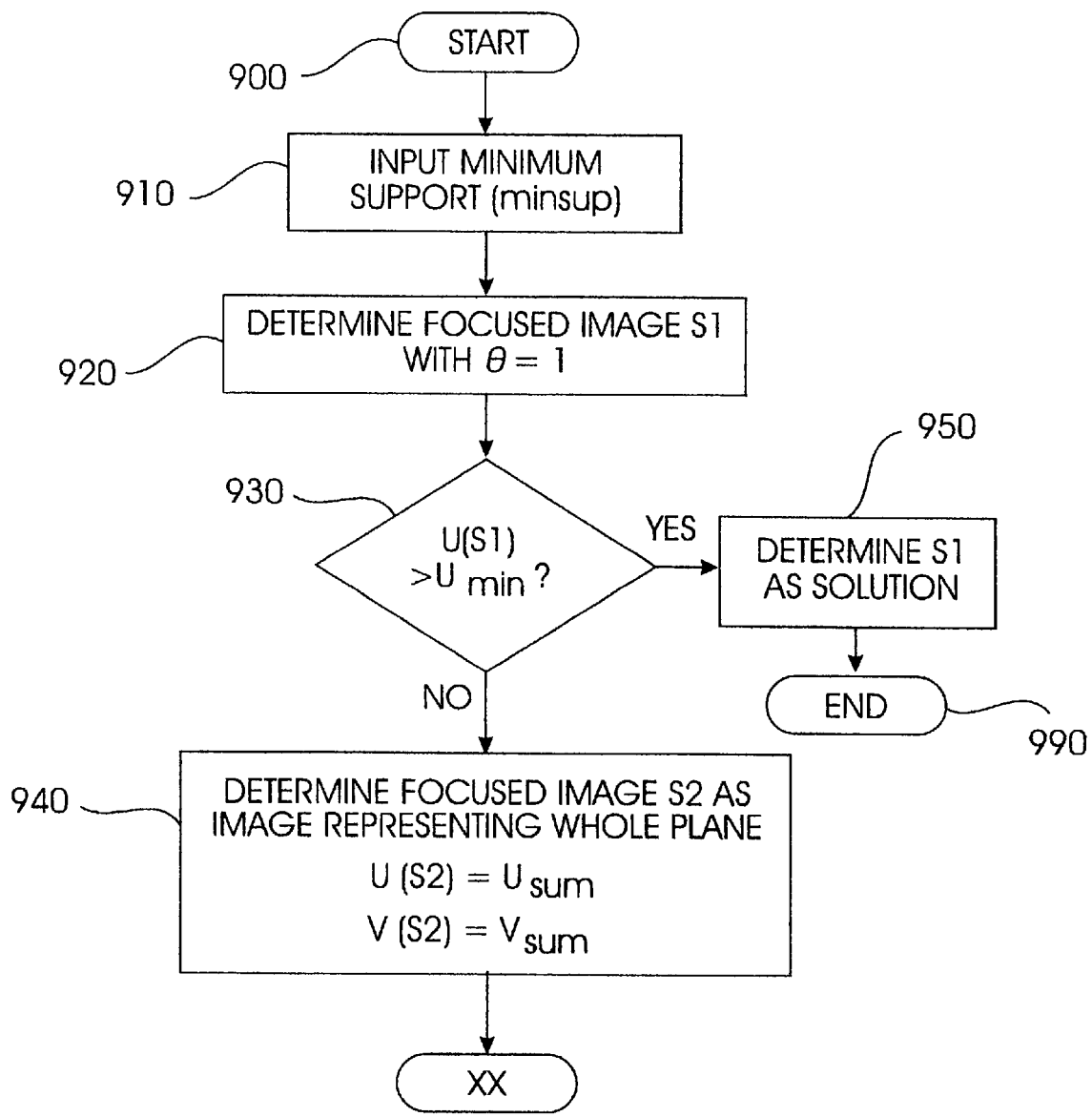
FIG. 21 represents part of the flow of a typical process for deriving a confidence maximization rule.

B. Confidence maximization rule (FIGS. 21 and 22)

In this case, by the definition of the rule, a minimum support minsup (the proportion of data included in a region to the number of whole data) is input (step 910).

At this point, Umin=(Usum×minsup) is calculated. Referring to FIG. 4, a vertical dotted line designated as minimum support corresponds to this value. First, a focused image S1 is determined for θ=1 (step 920). And, it is determined whether the number U(S1) of data included in this S1 satisfies U(S1)>Umin (step 930). If it is valid, S1 is determined as a solution (step 950), and the process is terminated (step 990). If it is not valid, a focused image S2 is determined to be the image representing the whole plane. That is, a substitution is made by U(S2)=Usum and V(S2)=Vsum (step 940). Then, the process moves to FIG. 22 through point XX.

Figure 22:
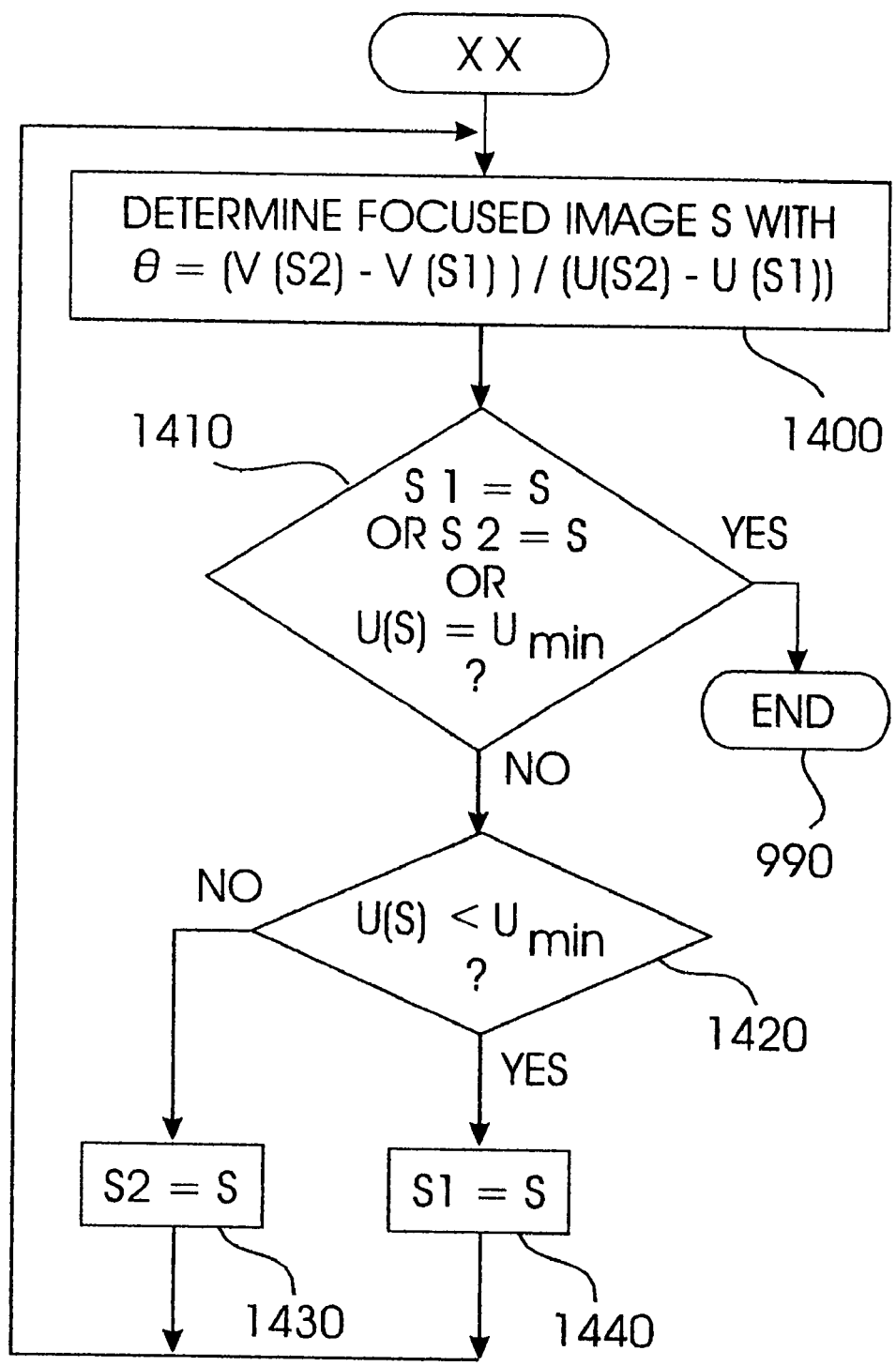
FIG. 22 represents part of the flow of a typical process for deriving a confidence maximization rule.

In FIG. 22, the process starts at point XX, and a new condition θ is obtained, for which a focused image S is calculated (step 1400). This θ is calculated by $$\theta=(V(S2)-V(S1))/(U(S2)-U(S1)) \quad (26)$$

If S1=S or S2=S, no additional focused image exists between (S1, S2), S2 having high confidence is output as the best solution and the process ends (step 1410). Further, if U(S)≈Umin, S is output and the process is ended. However, if U(S)<Umin (step 1420), a further processing is required, so making S1=S (step 1440), the process returns to step 1400. Similarly, if U(S)>Umin, the process returns to step 1400 with S2=S (step 1430).

By repeating the process starting from step 1400, a solution can be found. Referring to FIG. 4, region 40 above the minimum support is where a solution exists. Each circle point 42 in the convex hull is a strict solution, but, in the present invention, an approximate solution obtained by a hand probe is output. The detected solution may be presented to the user, or the necessary attributes of data belonging to that focused image may be output.

Figure 23:
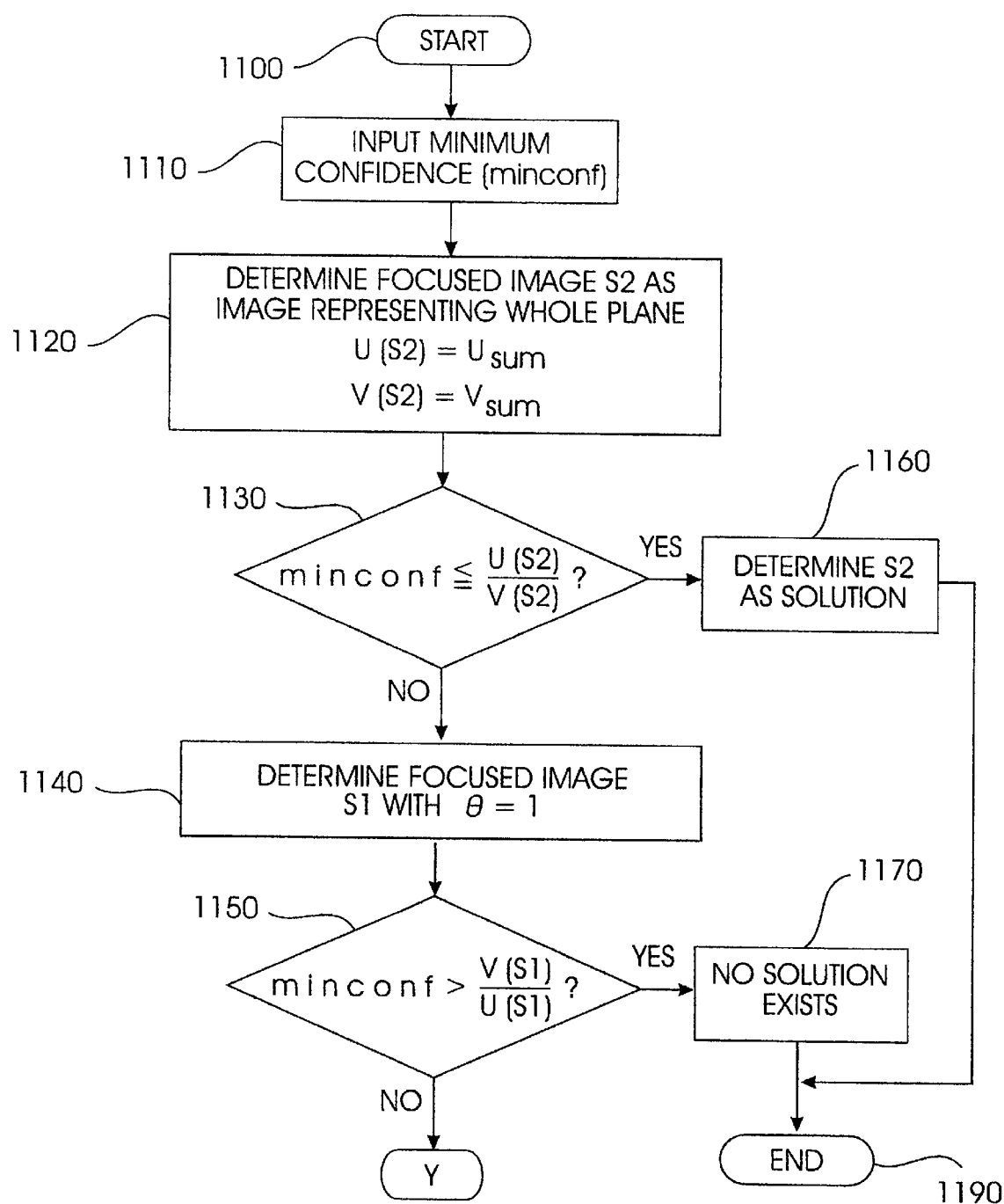
FIG. 23 represents part of the flow of a typical process for deriving a support maximization rule.

C. Support maximization rule (FIGS. 23 and 24)

In this case, by the definition of the rule, the minimum confidence minconf (the proportion of data whose true-false attribute is true to the number of data included in a rectilinear region) is input (step 1110). In the case of FIG. 4, a line 44, designated as minimum confidence and drawn from the origin, corresponds to the minimum confidence. First, a focused image S2 is assumed to be an image representing the whole plane. That is, a substitution is performed by U(S2)=Usum and V(S2)=Vsum (step 1120). At step 1130, it is determined whether minconf≦V(S2)/U(S2) is valid (step 1130). If this condition is valid, S2 is determined to be a solution (step 1160), and the process is terminated (step 1190). If the condition is not valid, a focused image S1 is sought for with θ=1 (step 1140). Then, it is determined whether minconf>V(S1)/U(S1) is valid (step 1150). If so, no solution exists, and the process is terminated. Otherwise, the process moves to FIG. 24 through point Y.

Figure 24:
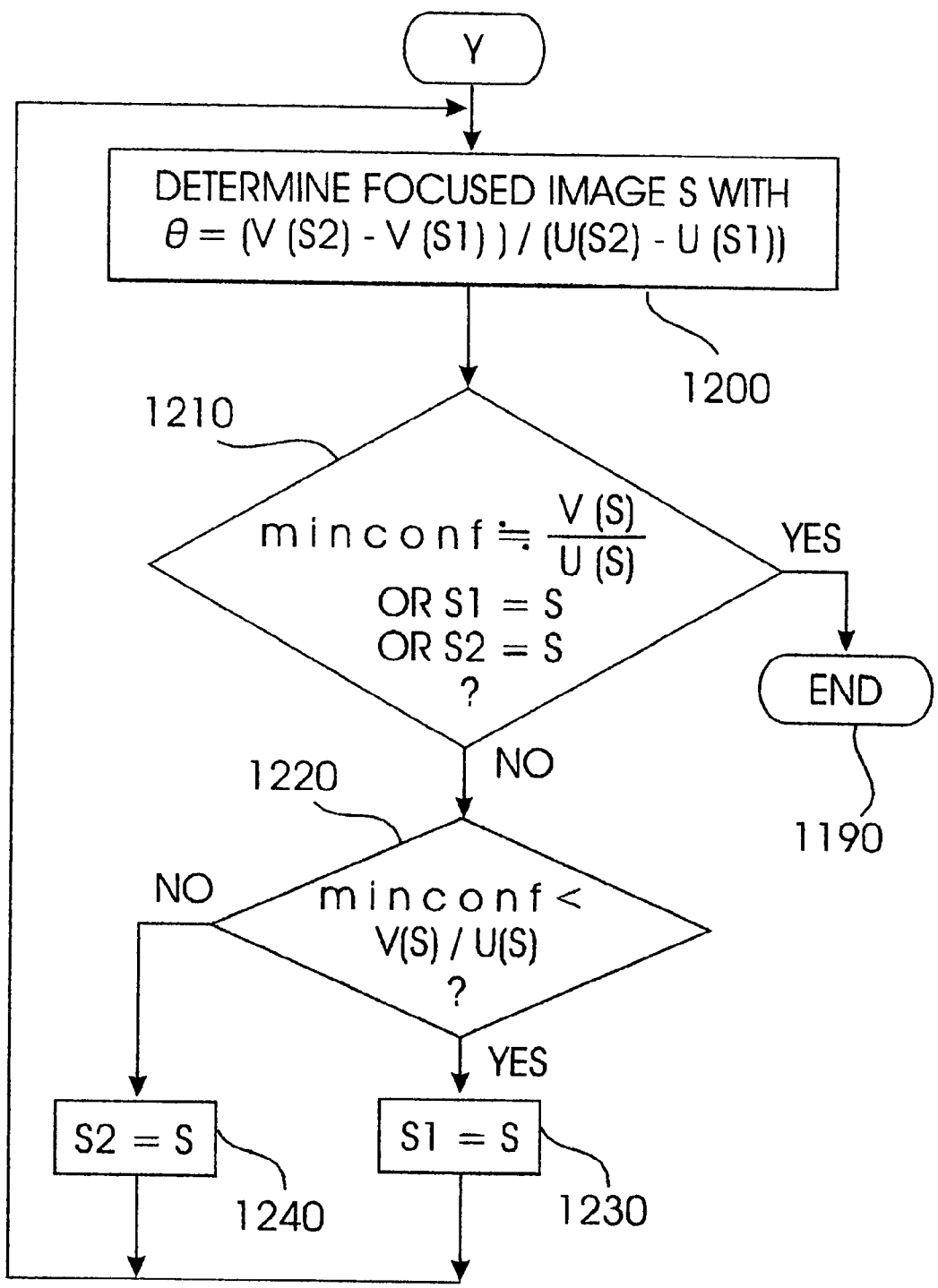
FIG. 24 represents part of the flow of a typical process for deriving a support maximization rule.

In FIG. 24, the process is started at point Y to find a focused image S for with θ=(V(S2)−V(S1))/(U(S2)−U(S1)) (step 1200). If (1) minconf≈V(S)/U(S) is valid for the obtained focused image S, this S is output and the process terminates (step 1210). Further, if S1=S or S2=S, there is no additional solution between S1 and S2, and thus S1 is output as the best solution and the process is terminated (step 1210). On the other hand, if minconf<V(S)/U(S) (step 1220), the process returns to step 1200 (step 1230) with S1=S. Further, if minconf>V(S)/U(S), the process returns to step 1200 with S2=S (step 1240).

By the above process, the support maximization rule is obtained. Again referring to FIG. 4, there is a solution in region 46 above line 44 (designated as the minimum confidence). Each circle point 42 in the convex hull is a strict solution. Since much calculation is required to find the points in the convex hull, an approximate solution maximizing the support is output using a point on the convex hull. As described above, the detected approximate solution or strict solution may be presented to the user, or the necessary attribute values of data included in the focused image may be output.

D. Optimized entropy rule

The optimized entropy rule is a rule that maximizes the increase in the information amount after the division as compared with the information amount before the division when the division of a region between the inside and outside thereof is considered. Accordingly, it is only needed to find a region where the gain (the following expression) of the entropy of the segmented region and the whole plane becomes maximum.

$$f(x, y) = -\frac{y}{a}\log\frac{y}{a} - \frac{x-y}{a}\log\frac{x-y}{a} - \quad (27)$$

-continued $$\frac{b-y}{a-x}\log\frac{b-y}{a-x} - $$
$$\frac{a-b-x+y}{a-x}\log\frac{a-b-x+y}{a-x}$$

In this expression, x represents U(S), y is V(S), a is Usum, and b is Vsum. Since there is a solution on the convex hull even under such condition, the above steps can be used. Accordingly, it is only needed to change θ for seeking for the focused image that maximizes the Equation (27).

E. Optimized interclass variance rule

As previously described, the optimized interclass variance rule is a rule to maximize the square sum of the "deviations from the average of the standardized proportions of true and false" of the inside and outside of a region is considered. Accordingly, it is only needed to find a region where the interclass variance (the following expression) of the segmented region and the whole plane becomes maximum.

$$f(x, y) = x\left(\frac{y}{x} - \frac{b}{a}\right)^2 + (a+x)\left(\frac{b-a}{a-x} - \frac{b}{a}\right)^2 \quad (28)$$

In the equation, x, y, a, and b are the same as those described above. Since a solution exists on the convex hull even under such condition, the above steps can be used. Accordingly, it is only needed to change θ for seeking the focused image that maximizes the Equation (28).

F. Others

As previously described, if a solution exists, or can be approximated that it exists, in a point on the convex hull of U(S) and V(S), then a region corresponding to a rule can be derived quickly using the above steps.

G. Extraction of secondary rule

After finding one rule by using the above described process, a secondary rule can be found. That is, v(i, j) belonging to one segmented focused image is removed, and v(i, j) is changed so that v(i, j)/u(i, j)=Vsum/Usum is satisfied, and then the region segmentation step is performed.

Figure 25:
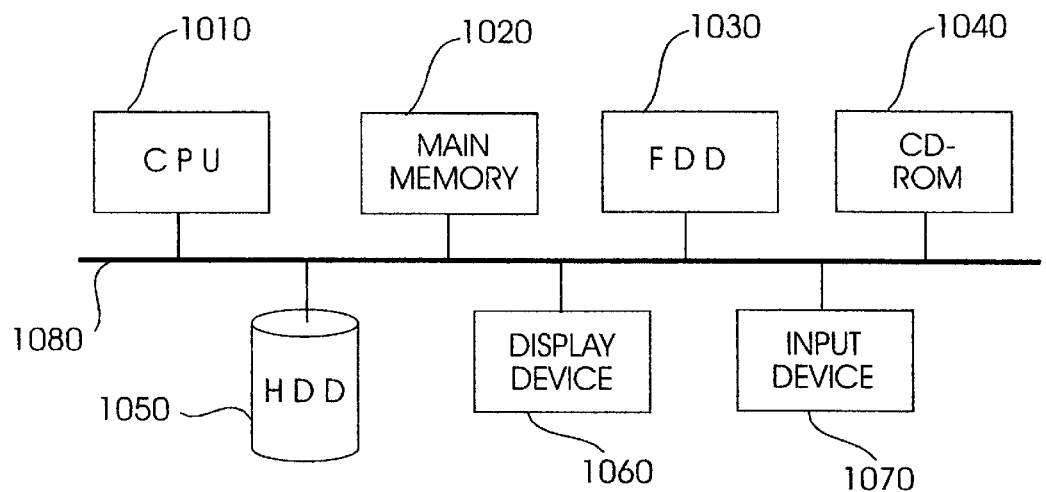
FIG. 25 shows an example of the device configuration in the implementation of the present invention using a conventional computer system.

The process steps in the present invention have been described. Such process steps may be implemented and executed by a computer program. For instance, it may be a program which can be executed in the conventional computer system as shown in FIG. 25. The processing program is stored in a hard disk 1050, loaded into a main memory 1020 when executed, and processed by a CPU 1010. Further, the disk 1050 also includes a database, which is accessed by the processing program. The plane to be processed and focused image are presented to the user by a display device 1060. The user inputs instructions of focused image selection and data output by means of an input device 1070. The input device may be a keyboard, mouse, pointing device, or a digitizer. Further, the output result may be stored in the floppy disk of a floppy disk drive 1030 which is a sub-storage device, and new data may be input from the drive 1030. Furthermore, a CD-ROM drive 1040 can also be used to input data.

Further, the computer program implementing the process of the present invention can be stored in a storage medium such as a floppy disk or CD-ROM which can be carried. In this case, the data extraction portion of a common database retrieval program or a program performing only the process for displaying on the display device 1060 may be already stored on the disk 1050. Accordingly, the distribution of other portions by such storage medium as described above is a matter which is commonly performed. Further, a communication apparatus, not shown, is connected to a bus 1080, a processing may be performed using a database at a remote site, or a result of the processing may be sent to a remote site.

Figure 26:
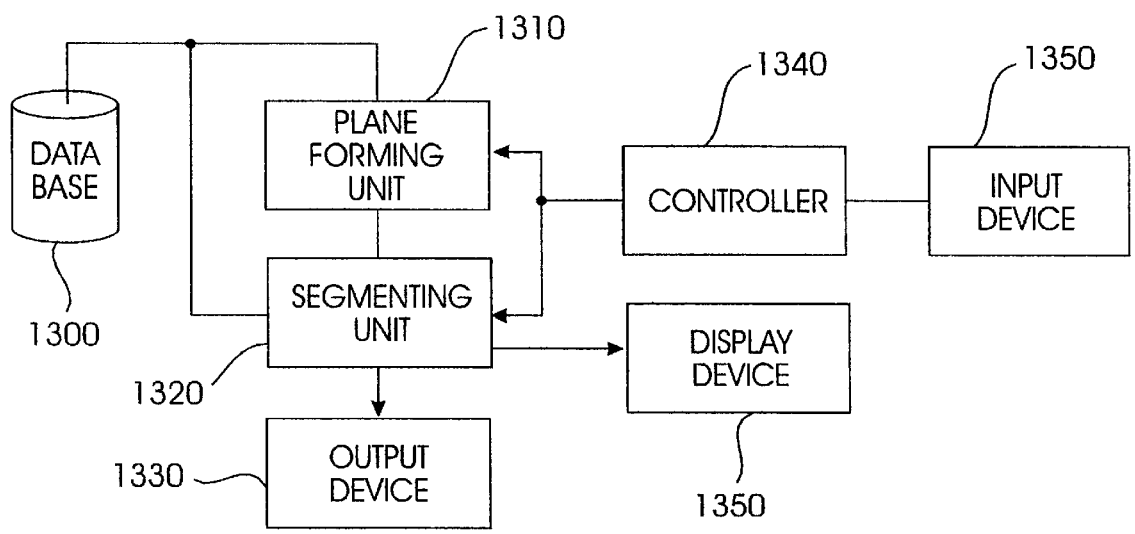
FIG. 26 is a block diagram of a typical implementation of the present invention by a special apparatus.

Further, a special apparatus may be provided for implementing the process of the present invention. For instance, an apparatus as shown in FIG. 26 may be used. A plane forming unit 1310 is connected to a database 1300 and a segmenting unit 1320, and accepts instructions from a controller 1340. Further, the segmenting unit 1320 is connected to an output device 1330 and a display device 1350, and accepts instructions from the controller 1340. The segmenting unit 1320 is also connected to the database. The controller 1340 is connected to an input device 1360, and controls the plane forming unit 1310 and the segmenting unit 1320 according to the type of the processing instructed by the input device 1360.

The operation of this apparatus is now briefly described. The plane forming unit 1310 is part of the apparatus for carrying out the above plane-forming step. It uses data stored in the database to form the previously shown plane, and outputs it to the segmenting unit 1320. The segmenting unit 1320 sets θ, a parameter for segmentation, according to the instruction from the controller 1340. According to the set θ, the segmenting unit 1320 executes the above-mentioned segmentation step to segment a focused image. It outputs the focused image to the display device 1140, and if instructed by the user, takes out data belonging to the segmented focused image from the database 1300, and passes it to the output device 1330. The output device 1330 outputs the data desired by the user in a proper form. Further, for instance, the user gives an instruction to solve the confidence maximization rule from the input device 1360, and inputs a minimum support. Then, the controller 1340 sets a condition θ to perform the process described in part B (above) and outputs it to the segmenting unit 1320. A process such as changing the condition θ is performed to solve a region which matches the instructed confidence maximization rule.

The controller 1340 performs a processing for passing to the segmenting unit 1320 a condition θ which is suitable for the above described support maximization rule process (part C above), optimized entropy rule process (part D), and optimized interclass variance rule process (part E), and the processing for segmenting a region on the convex hull (part F). The user inputs the type of a processing and a condition such as described above (not only θ, but minconf and minsup) from the input device 1360. Further, the controller 1340 instructs the plane forming unit 1310 to perform a processing such as for removing V(i, j) of the segmented focused image to perform the process described in part G.

Although an example has been shown in which the present invention is implemented in a special apparatus, the present invention is not limited as such. For instance, the output of the segmenting unit 1320 may be provided to the output device 1160 and the display device 1140 through an output controller. The database may be referenced from the output controller to take out data.

The above process was described for the case in which two terms of the K numeric attributes are selected for finding the correlation between them. However, this process can be expanded to an n-dimensional retrieval if a region of an n-dimensional space can be segmented with Equation (8) being an objective function.

While a method and apparatus for finding an association rule from data have been described in detail with reference to the accompanied drawings, those skilled in the art can appreciate that various modifications and changes can be made without departing from the spirit and scope of the present invention. The scope of the present invention is limited only by the appended claims.

What is claimed is:

1. A method for deriving an association rule between data in a database, said data including at least two kinds of numeric attributes and at least one kind of true-false attribute, said method comprising the steps of:

storing the number u(i,j) of data in each pixel (i-th row, j-th column) and the number v(i,j) of data in each pixel, whose true-false attribute is true, so as to correspond to each pixel in a plane, wherein said plane has two axes respectively corresponding to said two kinds of numeric attributes and is divided into N×M pixels;

inputting a condition θ;

segmenting from said plane a rectilinear region S of said pixels, said rectilinear region S maximizing $$\sum_{(i,j)\in S} g(i,j) = \sum_{(i,j)\in S} (v(i,j) - \theta u(i,j)); \text{ and} \quad \text{(Equation 29)}$$

outputting data included in said segmented rectilinear region S.

2. The method according to claim 1, further comprising the steps of:

inputting a second condition $\theta_2$ which is different from said input condition θ;

segmenting from said plane a second rectilinear region $S_2$ of said pixels, said second rectilinear region $S_2$ maximizing $$\sum_{(i,j)\in S_2} g(i,j) = \sum_{(i,j)\in S_2} (v(i,j) - \theta_2 u(i,j)); \text{ and}$$

segmenting from said plane a third rectilinear region $S_3$ of said pixels, said third rectilinear region $S_3$ maximizing $$\sum_{(i,j)\in S_3} g(i,j) = \sum_{(i,j)\in S_3} (v(i,j) - \theta_3 u(i,j))$$

with $$\theta_3 = \frac{V(S_2) - V(S)}{U(S_2) - U(S)}$$

as a third condition, wherein $V(S_2)$ is the number of data in said second rectilinear region $S_2$, whose true-false attribute is true, V(S) is the number of data in said rectilinear region S, whose true-false attribute is true, $U(S_2)$ is the number of data in said second rectilinear region $S_2$, and U(S) is the number of data in said rectilinear region S.

3. The method according to claim 2, further comprising the steps of:

changing v(i, j) so that v(i, j)/u(i, j) in each pixel in said segmented rectilinear region S becomes equal to the ratio of the number of data in the whole plane whose true-false attribute is true to the number of data in said whole plane; and segmenting a fourth rectilinear region $S_4$ of said pixels, said fourth rectilinear region $S_4$ maximizing $$\sum_{(i,j)\in S_4} g(i,j) = \sum_{(i,j)\in S_4} (v(i,j) - \theta_4 u(i,j))$$

by using said changed v(i, j) and following an input condition $\theta_4$.

4. The method according to claim 1, wherein said storing step comprises the steps of:

randomly sampling X data from a plurality of data;

sorting the sampled data for each said numeric attribute, and storing the X·i/N (i=1, 2, ... N)-th numeric value and the X·n/M (n=1, 2, ... M)-th numeric value; and based on said stored numeric values, judging in which of said N×M pixels each of said plurality of data is included, and counting the number in each pixel.

5. The method according to claim 1, wherein said segmenting step comprises the steps of:

storing a section [x,y] in the (m−1)-th column of a rectilinear region $S^W_m(s,t)$ whose value of the Equation (29) is maximum among first rectilinear regions and second rectilinear regions or information representing that the m-th column is the leftmost column into a storage $H^W$ so as to correspond to said m and said [s,t], wherein the section [s,t] in the m-th column of the first rectilinear regions is the rightmost column and the section [x,y] in the (m−1)-th column of the first rectilinear regions is included in the section [s,t], and the second rectilinear regions consist of the section [s,t] in the m-th column, and storing a value of the Equation (29) of said rectilinear region $S^W_m(s,t)$;

storing (a) a section [x,y] in the (m−1)-th column and (b) a relationship between the section [x,y] in the (m−1)-th column and a section [a,b] in the (m−2)-th column of a rectilinear region $S^U_m(s,t)$ whose value of the Equation (29) is maximum among first rectilinear regions and second rectilinear regions or information representing that the m-th column is the leftmost into a storage $H^u$ so as to correspond to said m and said [s,t], wherein the section [s,t] in the m-th column of the first rectilinear regions is the rightmost column, and the section [x,y] in the (m−1)-th column of the first rectilinear regions satisfies s≧x and t≧y, and the second rectilinear regions consist of the section [s,t] in the m-th column, and storing a value of the Equation (29) of said rectilinear region $S^U_m(s,t)$;

storing (a) a section [x,y] in the (m−1)-th column and (b) a relationship between the section [x,y] in the (m−1)-th column and a section [a,b] in the (m−2)-th column of a rectilinear region $S^D_m(s,t)$ whose value of the Equation (29) is maximum among first rectilinear regions and second rectilinear regions or information representing that the m-th column is the leftmost into a storage $H^D$ so as to correspond to said m and said [s,t], wherein the section [s,t] in the m-th column of the first rectilinear regions is the rightmost column, and the section [x,y] in the (m−1)-th column of the first rectilinear regions satisfies s≧x and t≧y, and the second rectilinear regions consist of the section [s,t] in the m-th column, and storing a value of the Equation (29) of said rectilinear region $S^D_m(s,t)$;

storing (a) a section [x,y] in the (m−1)-th column and (b) a relationship between the section [x,y] in the (m−1)-th column and a section [a,b] in the (m−2)-th column of a rectilinear region $S^N_m(s,t)$ whose value of the Equation (29) is maximum among first rectilinear regions and second rectilinear regions or information representing that the m-th column is the leftmost into a storage $H^N$ so as to correspond to said m and said [s,t], wherein the section [s,t] in the m-th column of the first rectilinear regions is the rightmost column, and the section [x,y] in the (m−1)-th column of the first rectilinear regions satisfies s≧x and t≦y, and the second rectilinear regions consist of the section [s,t] in the m-th column, and storing a value of the Equation (29) of said rectilinear region $S^N_m(s,t)$; and executing said first to fourth storing steps for all m and [s, t], and using m and [s, t] of the rectilinear region S having the maximum value of the Equation (29), and the value in the corresponding storage $H^W$, $H^U$, $H^D$, or $H^N$ to segment the rectilinear region S from said plane.

6. A method for segmenting a rectilinear region S maximizing $$\sum_{(i,j)\in S} g(i, j) = \sum_{(i,j)\in S} (v(i, j) - \theta u(i, j)) \qquad \text{(Equation 30)}$$

from a plane including a plurality of cells in each of which the number u(i, j) of points included in the inside and the number v(i, j) of points satisfying a predetermined condition are stored, said method comprising the steps of:

inputting θ;

storing a section [x,y] in the (m−1)-th column of a rectilinear region $S^W_m(s,t)$ whose value of the Equation (29) is maximum among first rectilinear regions and second rectilinear regions or information representing that the m-th column is the leftmost column into a storage $H^W$ so as to correspond to said m and said [s,t], wherein the all section [s,t] in the m-th column of the first rectilinear regions is the rightmost column and the section [x,y] in the (m−1)-th column of the first rectilinear regions is included in the section [s,t], and the second rectilinear regions consist of the section [s,t] in the m-th column, and storing a value of the Equation (30) of said rectilinear region $S^w_m(s,t)$;

storing (a) a section [x,y] in the (m−1)-th column and (b) a relationship between the section [x,y] in the (m−1)-th column and a section [a,b] in the (m−2)-th column of a rectilinear region $S^U_m(s,t)$ whose value of the Equation (29) is maximum among first rectilinear regions and second rectilinear regions or information representing that the m-th column is the leftmost into a storage $H^u$ so as to correspond to said m and said [s,t], wherein the section [s,t] in the m-th column of the first rectilinear regions is the rightmost column, and the section [x,y] in the (m−1)-th column of the first rectilinear regions satisfies s≧x and t≧y, and the second rectilinear regions consist of the section [s,t] in the m-th column, and storing a value of the Equation (30) of said rectilinear region $S^U_m(s,t)$;

storing (a) a section [x,y] in the (m−1)-th column and (b) a relationship between the section [x,y] in the (m−1)-th column and a section [a,b] in the (m−2)-th column of a rectilinear region $S^D_m(s,t)$ whose value of the Equation (29) is maximum among first rectilinear regions and second rectilinear regions or information representing that the m-th column is the leftmost into a storage $H^D$ so as to correspond to said m and said [s,t], wherein the section [s,t] in the m-th column of the first rectilinear regions is the rightmost column, and the section [x,y] in the (m−1)-th column of the first rectilinear regions satisfies s≦x and t≦y, and the second rectilinear regions consist of the section [s,t] in the m-th column, and storing a value of the Equation (30) of said rectilinear region $S^D_m(s,t)$;

storing (a) a section [x,y] in the (m−1)-th column and (b) a relationship between the section [x,y] in the (m−1)-th column and a section [a,b] in the (m−2)-th column of a rectilinear region $S^N_m(s,t)$ whose value of the Equation (30) is maximum among first rectilinear regions and second rectilinear regions or information representing that the m-th column is the leftmost into a storage $H^N$ So as to correspond to said m and said [s,t], wherein the section [s,t] in the m-th column of the first rectilinear regions is the rightmost column, and the section [x,y] in the (m−1)-th column of the first rectilinear regions satisfies s≧x and t≦y, and the second rectilinear regions consist of the section [s,t] in the m-th column, and storing a value of the Equation (30) of said rectilinear region $S^N_m(s\ t)$; and executing said first to fourth storing steps for all m and [s, t], and using m and [s, t] of the rectilinear region S having the maximum value of the Equation (30), and the value in the corresponding storage $H^W$, $H^U$, $H^D$, or $H^N$ to segment the rectilinear region S from said plane.

7. The method according to claim 6, wherein said second storing step comprising the steps of. storing (a) a section [x,y] in the (m−1)-th column and (b) a relationship between the section [x,y] in the (m−1)-th column and a section [a,b] in the (m−2)-th column of a rectilinear region $S_m^U(s,t)$ whose value of the Equation (30) is maximum among first rectilinear regions and second rectilinear regions and third rectilinear regions or information representing the m-th column is the leftmost column into the storage $H^u$ so as to correspond to said m and said [s,t], wherein the section [s,t] in the m-th column of the first rectilinear regions is the rightmost column and the section [x,y] in the (m−1)-th column of the first regions satisfies s≧x and t=y and the section [a,b] in the (m−2)-th column of the first rectilinear regions satisfies a≧x and b≦y or a≦x and b≦y and the section [s,t] in the m-th column of the second rectilinear regions is the rightmost column and the section [x,y] in the (m−1)-th column of the second rectilinear region satisfies s≧x and s≦y≦t−1 and the section [a,b] in the (m−2)-th column of the second rectilinear regions satisfies a≧x and b≦y or a≦x and b≦y and the third rectilinear regions consist of the section [s,t] in the m-th column; and storing the value of the Equation (30) of the rectilinear region $S_m^U(s,t)$.

8. The method according to claim 6, wherein said third storing step comprising the step of:

storing (a) a section [x,y] in the (m−1)-th column and (b) a relationship between the section [x,y] in the (m−1)-th column and a section [a,b] in the (m−2)-th column of a rectilinear region $S_m^D(s,t)$ whose value of the Equation (30) is maximum among first rectilinear regions and second rectilinear regions and third rectilinear regions or information representing the m-th column is the leftmost column into the storage $H^D$ so as to correspond to said m and said [s,t], wherein the section [s,t] in the m-th column of the first rectilinear regions is the rightmost column and the section [x,y] in the (m−1)-th column of the first regions satisfies s=x and t≧y and the section [a,b] in the (m−2)-th column of the first rectilinear regions satisfies a≧x and b≦y or a≧x and b≧y and the section [s,t] in the m-th column of the second rectilinear regions is the rightmost column and the section [x,y] in the (m−1)-th column of the second rectilinear region satisfies s+1≦x≦t and y≧t and the section [a,b] in the (m−2)-th column of the second rectilinear regions satisfies a≧x and b≦y or a≧x and b≧y and the third rectilinear regions consist of the section [s,t] in the m-th column; and storing the value of the Equation (30) of the rectilinear region $S_m^D(s,t)$.

9. The method according to claim 6, wherein said fourth storing step comprising the step of:

storing (a) a section [x,y] in the (m−1)-th column and (b) a relationship between the section [x,y] in the (m−1)-th column and a section [a,b] in the (m−2)-th column of a rectilinear region $S_m^N(s,t)$ whose value of the Equation (30) is maximum among first rectilinear regions and second rectilinear regions and third rectilinear regions or information representing the m-th column is the leftmost column into the storage $H^N$ so as to correspond to said m and said [s,t], wherein the section [s,t] in the m-th column of the first rectilinear regions is the rightmost column and the section [x,y] in the (m−1)-th column of the first regions is the same as the section [s,t] and the section [s,t] in the m-th column of the second rectilinear regions is the rightmost column and the section [x,y] in the (m−1)-th column of the second rectilinear region satisfies x≦s and y≧t+1 or x≦s−1 and y≧t and the third rectilinear regions consist of the section [s,t] in the m-th column; and storing the value of the Equation (30) of the rectilinear region $S_m^D(s,t)$.

10. The method according to claim 6, wherein the step of executing said first to said fourth storing steps comprises the steps of executing said first to fourth storing steps for all m and [s, t];

by using m and [s, t] of the rectilinear region S having the maximum value of the Equation (30), and the corresponding storage $H^W$, $H^U$, $H^D$, or $H^N$, reading out the section [x, y] in the (m−1)-th column and the relationship between said (m−1)-th column and (m−2)-th column;

by using the relationship between said (m−1)-th column and (m−2)-th column, selecting the corresponding storage from said storage $H^W$, $H^U$, $H^D$, and $H^N$;

by using the section [x, y] in said (m−1)-th column, reading out the section [a, b] in the (m−2)-th column and the relationship between the (m−2)-th column and the m−3-th column from the selected storage; and repeating said selecting step and said second reading step until the relationship with the preceding column becomes information representing the leftmost column.

11. An apparatus for deriving an association rule between data in a database, each data including at least two kinds of numeric attributes and at least one kind of true-false attribute, said apparatus comprising:

a plane forming processor for storing the number u(i,j) of data in each pixel (i-th row, j-th column) and the number v(i,j) of data in each pixel, whose true-false attribute is true, so as to correspond to each pixel in a plane, wherein said plane has two axes respectively corresponding to said two kinds of numeric attributes and is divided into N×M pixels;

an input device for inputting a condition θ;

a region segmenting processor for segmenting from said plane a rectilinear region S of said pixels, said rectilinear region S maximizing $$\sum_{(i,j)\in S} g(i,j) = \sum_{(i,j)\in S} (v(i,j) - \theta u(i,j)); \text{ and}$$

a device for outputting data included in said segmented rectilinear region S.

12. The apparatus for deriving an association rule between data as set forth in claim 11, further comprising:

a device for outputting as a third condition to said region segmenting processor, $$\theta 3 = \frac{V(S_2) - V(S)}{U(S_2) - U(S)}$$

if a second condition $\theta_2$ different from said condition θ is input by said input device and a second rectilinear region $S_2$ corresponding to said second condition $\theta_2$ is segmented from said plane by said region segmenting processor, wherein $V(S_2)$ is the number of data in said second rectilinear region $S_2$, whose true-false attribute is true, V(S) is the number of data in said rectilinear region S, whose true-false attribute is true, $U(S_2)$ is the number of data in said second rectilinear region $S_2$, and U(S) is the number of data in said rectilinear region S.

13. The apparatus for deriving an association rule between data as set forth in claim 11, further comprising:

means for changing v(i, j) so that v(i, j)/u(i, j) in each pixel in said segmented rectilinear region S becomes equal to the ratio of the number of data in the whole plane whose true-false attribute is true to the number of data in said whole plane; and means for instructing said region segmenting processor to operate with said changed v(i, j) and an input condition $\theta_4$.

14. The apparatus for deriving an association rule between data as set forth in claim 11, said plane forming processor comprising:

means for randomly sampling X data from a plurality of data;

means for sorting the sampled data for each said numeric attribute, and storing the X·i/N (i=1, 2, . . . N)-th numeric value and the X·n/M (n=1, 2, . . . M)-th numeric value; and means, based on said stored numeric values, for judging in which of said N×M pixels each of said plurality of data is included, and counting the number in each pixel.

15. An apparatus for segmenting a rectilinear region S maximizing $$\sum_{(i,j)\in S} g(i,j) = \sum_{(i,j)\in S} (v(i,j) - \theta u(i,j)) \qquad \text{(Equation 31)}$$

from a plane including a plurality of cells in each of which the number u(i, j) of points included in the inside and the number v(i, j) of points satisfying a predetermined condition are stored, said apparatus comprising:

means for inputting θ;

first storing means for storing a section [x,y] in the (m−1)-th column of a rectilinear region $S^w_m(s,t)$ whose value of the Equation (31) is maximum among first rectilinear regions and second rectilinear regions or information representing that the m-th column is the leftmost column into a storage $H^W$ so as to correspond to said m and said [s,t], wherein the section [s,t] in the m-th column of the first rectilinear regions is the rightmost column and the section [x,y] in the (m−1)-th column of the first rectilinear regions is included in the section [s,t], and the second rectilinear regions consist of the section [s,t] in the m-th column, and for storing a value of the Equation (31) of said rectilinear region $S^W_m(s,t)$;

second storing means for storing (a) a section [x,y] in the (m−1)-th column and (b) a relationship between the section [x,y] in the (m−1)-th column and a section [a,b] in the (m−2)-th column of a rectilinear region $S^U_m(s,t)$ whose value of the Equation (31) is maximum among first rectilinear regions and second rectilinear regions or information representing that the m-th column is the leftmost into a storage $H^u$ so as to correspond to said m and said [s,t], wherein the section [s,t] in the m-th column of the first rectilinear regions is the rightmost column, and the section [x,y] in the (m−1)-th column of the first rectilinear regions satisfies s≧x and t≧y, and the second rectilinear regions consist of the section [s,t] in the m-th column, and for storing a value of the Equation (31) of said rectilinear region $S^U_m(s,t)$;

third storing means for storing (a) a section [x,y] in the (m−1)-th column and (b) a relationship between the section [x,y] in the (m−1)-th column and a section [a,b] in the (m−2)-th column of a rectilinear region $S^D_m(S,t)$ whose value of the Equation (31) is maximum among first rectilinear regions and second rectilinear regions or information representing that the m-th column is the leftmost into a storage $H^D$ so as to correspond to said m and said [s,t] wherein the section [s,t] in the m-th column of the first rectilinear regions is the rightmost column, and the section [x,y] in the (m−1)-th column of the first rectilinear regions satisfies s≦x and t≦y, and the second rectilinear regions consist of the section [s,t] in the m-th column, and storing a value of the Equation (31) of said rectilinear region $S^D_m(s,t)$;

fourth storing means for storing (a) a section [x,y] in the (m−1)-th column and (b) a relationship between the section [x,y] in the (m−1)-th column and a section [a,b] in the (m−2)-th column of a rectilinear region $S^N_m(s,t)$ whose value of the Equation (31) is maximum among first rectilinear regions and second rectilinear regions or information representing that the m-th column is the leftmost into a storage $H^N$ so as to correspond to said m and said [s,t], wherein the section [s,t] in the m-th column of the first rectilinear regions is the rightmost column, and the section [x,y] in the (m−1)-th column of the first rectilinear regions satisfies s≧x and t≦y, and the second rectilinear regions consist of the section [s,t] in the m-th column, and storing a value of the Equation (31) of said rectilinear region $S^N_m(s,t)$; and means for operating said first to fourth storing means for all m and [s, t], and for using m and [s, t] of the rectilinear region S having the maximum value of the Equation (31), and the value in the corresponding storage $H^W$, $H^U$, $H^D$, or $H^N$ to segment the rectilinear region S from said plane.

16. A storage device storing a program for causing a computer to derive an association rule between data in a database, each data including at least two kinds of numeric attributes and at least one kind of true-false attribute, said program comprising the steps of: storing the number u(i,j) of data in each pixel (i-th row, j-th column) and the number v(i,j) of data in each pixel, whose true-false attribute is true, so as to correspond to each pixel in a plane, wherein said plane has two axes respectively corresponding to said two kinds of numeric attributes and is divided into N×M pixels;

inputting a condition θ;

segmenting from said plane a rectilinear region S of said pixels, said rectilinear region S maximizing $$\sum_{(i,j) \in S} g(i,j) = \sum_{(i,j) \in S} (v(i,j) - \theta u(i,j)).$$

17. The storage device as set forth in claim 16, said program further comprising the steps of:

inputting a second condition $\theta_2$ which is different from said input condition θ;

segmenting from said plane a second rectilinear region $S_2$ of said pixels, said second rectilinear region $S_2$ maximizing $$\sum_{(i,j) \in S_2} g(i,j) = \sum_{(i,j) \in S_2} (v(i,j) - \theta_2 u(i,j)); \text{ and}$$

segmenting from said plane a third rectilinear region $S_3$ of said pixels, said third rectilinear region $S_3$ maximizing $$\sum_{(i,j) \in S_3} g(i,j) = \sum_{(i,j) \in S_3} (v(i,j) - \theta_3 u(i,j)) \text{ with}$$

$$\theta 3 = \frac{V(S_2) - V(S)}{U(S_2) - U(S)}$$

as a third condition, wherein $V(S_2)$ is the number of data in said second rectilinear region $S_2$, whose true-false attribute is true, V(S) is the number of data in said rectilinear region S, whose true-false attribute is true, $U(S_2)$ is the number of data in said second rectilinear region $S_2$, and U(S) is the number of data in said rectilinear region S.

18. The storage device as set forth in claim 16, said program further comprises the steps of:

changing v(i, j) so that v(i, j)/u(i, j) in each pixel in said segmented rectilinear region S becomes equal to the ratio of the number of data in the whole plane whose true-false attribute is true to the number of data in said whole plane; and segmenting a fourth rectilinear region $S_4$ of said pixels, said fourth rectilinear region $S_4$ maximizing $$\sum_{(i,j) \in S_4} g(i,j) = \sum_{(i,j) \in S_4} (v(i,j) - \theta_4 u(i,j))$$

by using said changed v(i, j) and following an input condition $\theta_4$.

19. The storage device as set forth in claim 16, said storing step comprising the steps of:

randomly sampling X data from a plurality of data;

sorting the sampled data for each said numeric attribute, and storing the X·i/N (i=1, 2, . . . N)-th numeric value and the X·n/M (n=1, 2, . . . M)-th numeric value; and based on said stored numeric values, judging in which of said N×M pixels each of said plurality of data is included, and counting the number in each pixel.

20. A storage device storing a program for causing a computer to segment a rectilinear region S maximizing $$\sum_{(i,j)\in S} g(i, j) = \sum_{(i,j)\in S} (v(i, j) - \theta u(i, j)) \qquad \text{(Equation 32)}$$

from a plane including a plurality of cells in each of which the number u(i, j) of points included in the inside and the number v(i, j) of points satisfying a predetermined condition are stored, said program comprising the steps of:

inputting θ;

storing a section [x,y] in the (m−1)-th column of a rectilinear region $S^W_m(s,t)$ whose value of the Equation (32) is maximum among first rectilinear regions and second rectilinear regions or information representing that the m-th column is the leftmost ii column into a storage $H^W$ so as to correspond to said m and said [s,t], wherein the section [s,t] in the m-th column of the first rectilinear regions is the rightmost column and the section [x,y] in the (m−1)-th column of the first rectilinear regions is included in the section [s,t], and the second rectilinear regions consist of the section [s,t] in the m-th column, and storing a value of the Equation (32) of said rectilinear region $S^W_m(s,t)$;

storing (a) a section [x,y] in the (m−1)-th column and (b) a relationship between the section [x,y] in the (m−1)-th column and a section [a,b] in the (m−2)-th column of a rectilinear region $S^U_m(s,t)$ whose value of the Equation (32) is maximum among first rectilinear regions and second rectilinear regions or information representing that the m-th column is the leftmost into a storage $H^u$ so as to correspond to said m and said [s,t], wherein the section [s,t] in the m-th column of the first rectilinear regions is the rightmost column, and the section [x,y] in the (m−1)-th column of the first rectilinear regions satisfies s≧x and t≧y, and the second rectilinear regions consist of the section [s,t] in the m-th column, and storing a value of the Equation (32) of said rectilinear region $S^U_m(s,t)$;

storing (a) a section [x,y] in the (m−1)-th column and (b) a relationship between the section [x,y] in the (m−1)-th column and a section [a,b] in the (m−2)-th column of a rectilinear region $S^D_m(s,t)$ whose value of the Equation (32) is maximum among first rectilinear regions and second rectilinear regions or information representing that the m-th column is the leftmost into a storage $H^D$ so as to correspond to said m and said [s,t], wherein the section [s,t] in the m-th column of the first rectilinear regions is the rightmost column, and the section [x,y] in the (m−1)-th column of the first rectilinear regions satisfies s≦x and t≦y, and the second rectilinear regions consist of the section [s,t] in the m-th column, and storing a value of the Equation (32) of said rectilinear region $S^D_m(s,t)$;

storing (a) a section [x,y] in the (m−1)-th column and (b) a relationship between the section [x,y] in the (m−1)-th column and a section [a,b] in the (m−2)-th column of a rectilinear region $S^N_m(s,t)$ whose value of the Equation (32) is maximum among first rectilinear regions and second rectilinear regions or information representing that the m-th column is the leftmost into a storage $H^N$ so as to correspond to said m and said [s,t], wherein the section [s,t] in the m-th column of the first rectilinear regions is the rightmost column, and the section [x,y] in the (m−1)-th column of the first rectilinear regions satisfies s≧x and t≦y, and the second rectilinear regions consist of the section [s,t] in the m-th column, and storing a value of the Equation (32) of said rectilinear region $S^N_m(s,t)$; and executing said first to fourth storing steps for all m and [s, t], and using m and [s, t] of the rectilinear region S having the maximum value of the Equation (32), and the value in the corresponding storage $H^W$, $H^U$, $H^D$, or $H^N$ to segment the rectilinear region S from said plane.

* * * * *